US012349028B1

(12) United States Patent
Mendelson

(10) Patent No.: US 12,349,028 B1
(45) Date of Patent: Jul. 1, 2025

(54) INDOOR AND OUTDOOR WAYPOINTS PROVIDING NAVIGATION AND OTHER INFORMATION AND METHOD OF USE

(71) Applicant: Ehud Mendelson, Parkland, FL (US)

(72) Inventor: Ehud Mendelson, Parkland, FL (US)

( * ) Notice: Subject to any disclaimer, the term of this patent is extended or adjusted under 35 U.S.C. 154(b) by 623 days.

(21) Appl. No.: 17/575,283

(22) Filed: Jan. 13, 2022

Related U.S. Application Data

(62) Division of application No. 17/492,286, filed on Oct. 1, 2021, which is a division of application No. 16/240,780, filed on Jan. 6, 2019, now abandoned, which is a division of application No. 16/207,130, filed on Dec. 1, 2018, now abandoned, which is a division of application No. 16/019,465, filed on Jun. 26, 2018, now abandoned, which is a division of application No. 15/972,074, filed on May 4, 2018, now Pat. No. 10,117,078, which is a division of application No. 15/953,389, filed on Apr. 13, 2018, now Pat. No. 10,470,013, which is a division of application No. 15/687,445, filed on Aug. 26, 2017, now Pat. No. 9,961,507, which is a division of application No. 15/403,146, filed on Jan. 10, 2017, now Pat. No. 9,772,193, which is a division of application No. 15/397,685, filed on Jan. 3, 2017, now Pat. No. 9,674,684, which is a division of application No. 15/237,727, filed on Aug. 16, 2016, now Pat. No. 9,538,332, which is a division of application No. 15/086,028, filed on Mar. 30, 2016, now Pat. No. 9,420,423, said application No.
(Continued)

(51) Int. Cl.
*H04W 4/44* (2018.01)
*G01S 5/02* (2010.01)
*H04W 4/02* (2018.01)
*H04W 4/40* (2018.01)

(52) U.S. Cl.
CPC ............. *H04W 4/44* (2018.02); *G01S 5/0231* (2013.01); *H04W 4/023* (2013.01); *H04W 4/40* (2018.02)

(58) Field of Classification Search
CPC ......... H04W 4/44; H04W 4/40; H04W 4/023; G01S 5/0231
USPC ....................................................... 701/454
See application file for complete search history.

(56) References Cited

U.S. PATENT DOCUMENTS

| 3,114,128 A | 12/1963 | Ljungman |
| 3,130,298 A | 4/1964 | Schwarz |

(Continued)

FOREIGN PATENT DOCUMENTS

| CA | 2662606 A1 | 10/2009 |
| CA | 2697986 A1 | 9/2010 |

(Continued)

*Primary Examiner* — April G Gonzales
(74) *Attorney, Agent, or Firm* — Allen D. Hertz, P.A.; Allen D. Hertz

(57) ABSTRACT

A navigation system and method of use utilizes waypoints to guide people around urban environments, detecting a presence of a cellular phone and guides/navigates the user to destinations. The process can be an add-on to the cellular phone. The process focuses on the task of detecting and navigating even in situations in which Global Positioning Systems (GPS) cannot provide this information, such as when the person is indoors or in crowded urban areas where line of site to the GPS satellites is impractical and/or unavailable.

37 Claims, 8 Drawing Sheets

Related U.S. Application Data

14/285,406 is a division of application No. 14/285,332, filed on May 22, 2014, now Pat. No. 9,491,584, which is a division of application No. 14/285,273, filed on May 22, 2014, now Pat. No. 9,204,257, said application No. 15/086,028 is a division of application No. 14/285,406, filed on May 22, 2014, now Pat. No. 9,602,193, said application No. 14/285,273 is a division of application No. 14/285,209, filed on May 22, 2014, now Pat. No. 9,204,251, which is a division of application No. 13/135,421, filed on Jul. 5, 2011, now Pat. No. 9,374,673, which is a division of application No. 12/932,811, filed on Mar. 7, 2011, now Pat. No. 8,941,485, said application No. 14/285,209 is a division of application No. 12/930,735, filed on Jan. 14, 2011, now Pat. No. 9,020,687, and a division of application No. 12/587,042, filed on Oct. 1, 2009, now Pat. No. 8,866,876, said application No. 12/932,811 is a division of application No. 12/069,899, filed on Feb. 13, 2008, now Pat. No. 7,924,149, which is a division of application No. 11/472,706, filed on Jun. 22, 2006, now Pat. No. 8,896,485, said application No. 12/587,042 is a division of application No. 11/429,864, filed on May 8, 2006, now Pat. No. 8,836,580, said application No. 11/472,706 is a division of application No. 11/429,864, filed on May 8, 2006, now Pat. No. 8,836,580, said application No. 12/930,735 is a division of application No. 11/396,843, filed on Apr. 3, 2006, now Pat. No. 7,899,583.

(60) Provisional application No. 60/678,947, filed on May 9, 2005, provisional application No. 60/670,097, filed on Apr. 12, 2005.

(56) References Cited

U.S. PATENT DOCUMENTS

| | | | |
|---|---|---|---|
| 3,158,836 A | 11/1964 | McCauley | |
| 3,166,732 A | 1/1965 | Ljungman | |
| 3,867,615 A | 2/1975 | Sioufi | |
| 4,491,970 A | 1/1985 | LaWhite et al. | |
| 5,195,126 A | 3/1993 | Carrier et al. | |
| 5,250,955 A * | 10/1993 | Major | G08G 1/096716 342/407 |
| 5,272,483 A | 12/1993 | Kato | |
| 5,293,163 A | 3/1994 | Kakihara | |
| 5,305,370 A | 4/1994 | Kearns et al. | |
| 5,319,363 A | 6/1994 | Welch et al. | |
| 5,379,337 A | 1/1995 | Castillo et al. | |
| 5,383,127 A | 1/1995 | Shibata | |
| 5,416,712 A | 5/1995 | Geier | |
| 5,432,508 A | 7/1995 | Jackson | |
| 5,442,348 A | 8/1995 | Mushell | |
| 5,454,461 A | 10/1995 | Jacobs | |
| 5,479,482 A | 12/1995 | Grimes | |
| 5,485,520 A | 1/1996 | Chaum et al. | |
| 5,504,482 A | 4/1996 | Schreder | |
| 5,563,931 A | 10/1996 | Bishop et al. | |
| 5,568,535 A | 10/1996 | Sheffer et al. | |
| 5,596,625 A | 1/1997 | Leblanc | |
| 5,606,506 A | 2/1997 | Kyrtsos | |
| 5,638,279 A | 6/1997 | Kishi et al. | |
| 5,652,570 A | 7/1997 | Lepkofker | |
| 5,710,803 A | 1/1998 | Kowal et al. | |
| 5,712,619 A | 1/1998 | Simkin et al. | |
| 5,742,233 A | 4/1998 | Hoffman et al. | |
| 5,742,666 A | 4/1998 | Alpert | |
| 5,771,001 A | 6/1998 | Cobb | |
| 5,798,733 A | 8/1998 | Ethridge | |
| 5,838,237 A | 11/1998 | Revell et al. | |
| 5,844,522 A | 12/1998 | Sheffer | |
| 5,873,040 A | 2/1999 | Dunn et al. | |
| 5,910,782 A | 6/1999 | Schmitt et al. | |
| 5,929,777 A | 7/1999 | Reynolds | |
| 5,937,355 A | 8/1999 | Joong | |
| 5,940,481 A | 8/1999 | Zeitman | |
| 5,948,040 A * | 9/1999 | DeLorme | G06Q 10/02 701/426 |
| 5,971,921 A | 10/1999 | Timbel | |
| 5,995,040 A | 11/1999 | Issler et al. | |
| 6,014,555 A | 1/2000 | Tendler | |
| 6,028,537 A | 2/2000 | Suman et al. | |
| 6,034,641 A | 3/2000 | Kudoh et al. | |
| 6,072,396 A | 6/2000 | Gaukel | |
| 6,225,944 B1 | 5/2001 | Hayes | |
| 6,240,285 B1 | 5/2001 | Blum | |
| 6,249,674 B1 | 6/2001 | Verdonk | |
| 6,252,943 B1 | 6/2001 | Johnson et al. | |
| 6,340,928 B1 | 1/2002 | McCurdy | |
| 6,445,937 B1 | 9/2002 | daSilva | |
| 6,463,290 B1 | 10/2002 | Stilp | |
| 6,477,362 B1 | 11/2002 | Raith et al. | |
| 6,489,888 B1 | 12/2002 | Honeck et al. | |
| 6,492,944 B1 | 12/2002 | Stilp | |
| 6,502,030 B2 | 12/2002 | Hilleary | |
| 6,510,315 B1 | 1/2003 | Amson | |
| 6,535,127 B1 | 3/2003 | Taylor | |
| 6,556,816 B1 | 4/2003 | Gafrick et al. | |
| 6,571,092 B2 | 5/2003 | Faccin et al. | |
| 6,574,484 B1 | 6/2003 | Carley | |
| 6,594,666 B1 | 7/2003 | Biswas et al. | |
| 6,600,812 B1 | 7/2003 | Gentillin | |
| 6,628,913 B2 | 9/2003 | Humes | |
| 6,628,933 B1 | 9/2003 | Humes | |
| 6,636,732 B1 | 10/2003 | Boling et al. | |
| 6,646,604 B2 | 11/2003 | Anderson | |
| 6,671,350 B1 | 12/2003 | Oxley | |
| 6,738,628 B1 | 5/2004 | McCall et al. | |
| 6,807,564 B1 | 10/2004 | Zellner et al. | |
| 6,970,101 B1 | 11/2005 | Squire et al. | |
| 7,026,954 B2 | 4/2006 | Slemmer et al. | |
| 7,031,875 B2 | 4/2006 | Ellenby et al. | |
| 7,034,678 B2 | 4/2006 | Burkley et al. | |
| 7,058,385 B2 | 6/2006 | Lauper | |
| 7,072,666 B1 | 7/2006 | Kullman | |
| 7,224,773 B2 | 5/2007 | Croak et al. | |
| 7,245,216 B2 | 7/2007 | Burkley et al. | |
| 7,260,186 B2 | 8/2007 | Zhu | |
| 7,268,700 B1 | 9/2007 | Hoffberg | |
| 7,298,289 B1 | 11/2007 | Hoffberg | |
| 7,317,927 B2 | 1/2008 | Staton | |
| 7,324,801 B2 | 1/2008 | Droste et al. | |
| 7,349,706 B2 | 3/2008 | Kim et al. | |
| 7,382,274 B1 | 6/2008 | Kennani et al. | |
| 7,409,044 B2 | 8/2008 | Leduc | |
| 7,436,938 B2 | 10/2008 | Savaglio et al. | |
| 7,437,143 B1 | 10/2008 | Williams | |
| 7,469,138 B2 | 12/2008 | Dayar | |
| 7,483,519 B2 | 1/2009 | Binning | |
| 7,483,917 B2 | 1/2009 | Sullivan et al. | |
| 7,519,351 B2 | 4/2009 | Malone, III | |
| 7,519,372 B2 | 4/2009 | MacDonald et al. | |
| 7,548,158 B2 | 6/2009 | Titus et al. | |
| 7,565,131 B2 | 7/2009 | Rollender | |
| 7,646,854 B2 | 1/2010 | Anderson | |
| 7,676,215 B2 | 3/2010 | Chin et al. | |
| 7,684,782 B2 | 3/2010 | Ashley, Jr. | |
| 7,743,337 B1 | 6/2010 | Maeda et al. | |
| 7,848,733 B2 | 12/2010 | Bull et al. | |
| 7,907,931 B2 | 3/2011 | Hartigan et al. | |
| 7,933,395 B1 | 4/2011 | Bailly et al. | |
| 7,949,326 B2 | 5/2011 | Gallagher et al. | |
| 8,009,810 B2 | 8/2011 | Seidberg et al. | |
| 8,041,330 B1 | 10/2011 | Garin | |
| 8,041,335 B2 | 10/2011 | Khetawat et al. | |
| 8,041,341 B1 | 10/2011 | Malackowski et al. | |
| 8,045,954 B2 | 10/2011 | Barbeau et al. | |
| 8,068,881 B2 | 11/2011 | Schranger | |
| 8,102,972 B2 | 1/2012 | Poremba | |
| 8,126,424 B2 | 2/2012 | Piett | |

(56) References Cited

U.S. PATENT DOCUMENTS

| | | |
|---|---|---|
| 8,126,960 B2 | 2/2012 | Obradovich et al. |
| 8,150,367 B1 | 4/2012 | Malladi |
| 8,165,560 B2 | 4/2012 | Stenquist |
| 8,165,562 B2 | 4/2012 | Piett |
| 8,179,281 B2 | 5/2012 | Strauss |
| 8,185,087 B2 | 5/2012 | Mitchell, Jr. et al. |
| 8,195,121 B2 | 6/2012 | Dunn et al. |
| 8,219,135 B2 | 7/2012 | De Amorim et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,401,565 B2 | 3/2013 | Sandberg et al. |
| 8,417,212 B2 | 4/2013 | Cepuran et al. |
| 8,472,973 B2 | 6/2013 | Lin |
| 8,484,352 B2 | 7/2013 | Piett |
| 8,489,062 B2 | 7/2013 | Ray et al. |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,587,454 B1 | 11/2013 | Dearworth |
| 8,594,015 B2 | 11/2013 | Dunn et al. |
| 8,606,218 B2 | 12/2013 | Ray et al. |
| 8,610,609 B2 | 12/2013 | Ginetti |
| 8,625,578 B2 | 1/2014 | Roy et al. |
| 8,626,112 B2 | 1/2014 | Ray et al. |
| 8,644,301 B2 | 2/2014 | Tarnhankar et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,705,527 B1 | 4/2014 | Addepalli |
| 8,712,366 B2 | 4/2014 | Greene et al. |
| 8,747,336 B2 | 6/2014 | Tran |
| 8,751,265 B2 | 6/2014 | Piett |
| 8,760,290 B2 | 6/2014 | Piett |
| 8,770,477 B2 | 7/2014 | Hefetz |
| 8,811,915 B2 | 8/2014 | Faccin et al. |
| 8,825,687 B2 | 9/2014 | Marceau |
| 8,836,580 B2 | 9/2014 | Mendelson |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,896,485 B2 | 11/2014 | Mendelson |
| 8,948,732 B1 | 2/2015 | Negahban et al. |
| 8,971,839 B2 | 3/2015 | Hong |
| 8,984,143 B2 | 3/2015 | Serra |
| 9,008,078 B2 | 4/2015 | Kamelar et al. |
| 9,019,870 B2 | 4/2015 | Khan |
| 9,071,643 B2 | 6/2015 | Saito |
| 9,077,676 B2 | 7/2015 | Price |
| 9,078,092 B2 | 7/2015 | Piett |
| 9,094,816 B2 | 7/2015 | Maier et al. |
| 9,167,379 B1 | 10/2015 | Hamilton et al. |
| 9,204,251 B1 | 12/2015 | Mendelson |
| 9,244,922 B2 | 1/2016 | Marceau |
| 9,258,680 B2 | 2/2016 | Drucker |
| 9,277,389 B2 | 3/2016 | Saito |
| 9,351,142 B2 | 5/2016 | Basore et al. |
| 9,369,847 B2 | 6/2016 | Borghei |
| 9,392,406 B2 | 7/2016 | Houri |
| 9,402,159 B1 | 7/2016 | Self et al. |
| 9,491,584 B1 * | 11/2016 | Mendelson ............ G08C 17/02 |
| 9,503,876 B2 | 11/2016 | Konrad |
| 9,538,332 B1 | 1/2017 | Mendelson |
| 9,544,750 B1 | 1/2017 | Self et al. |
| 9,553,626 B2 | 1/2017 | Callaway, Jr. |
| 9,591,467 B2 | 3/2017 | Piett |
| 9,635,534 B2 | 4/2017 | Maier et al. |
| 9,659,484 B1 | 5/2017 | Mehta et al. |
| 9,693,213 B2 | 6/2017 | Self et al. |
| 9,736,670 B2 | 8/2017 | Mehta et al. |
| 9,805,430 B2 | 10/2017 | Maisnik et al. |
| 9,838,858 B2 | 12/2017 | Anand |
| 9,992,655 B2 | 6/2018 | Anand |
| 11,986,963 B2 * | 5/2024 | Szafir ..................... G06V 20/10 |
| 2001/0026223 A1 | 10/2001 | Menard et al. |
| 2002/0001367 A1 | 1/2002 | Lee |
| 2002/0027975 A1 | 3/2002 | Oxley |
| 2002/0057678 A1 | 5/2002 | Jiang et al. |
| 2002/0075941 A1 | 6/2002 | Souissi |
| 2002/0120698 A1 | 8/2002 | Tamargo |
| 2002/0129138 A1 | 9/2002 | Carter |
| 2002/0131386 A1 | 9/2002 | Gwon |
| 2003/0018708 A1 | 1/2003 | Hlasny |
| 2003/0034881 A1 | 2/2003 | Linnett et al. |
| 2003/0045280 A1 * | 3/2003 | Simons ................ H04W 4/021 |
| | | 379/56.3 |
| 2003/0050039 A1 | 3/2003 | Baba et al. |
| 2003/0058808 A1 | 3/2003 | Eaton |
| 2003/0067392 A1 * | 4/2003 | Monroe ............... G08B 25/006 |
| | | 340/574 |
| 2003/0069035 A1 | 4/2003 | Shurvinton |
| 2003/0087628 A1 | 5/2003 | Michibata |
| 2003/0091159 A1 | 5/2003 | Oxley |
| 2003/0148771 A1 | 8/2003 | de Verteuil |
| 2004/0066917 A1 | 4/2004 | Yasukawa et al. |
| 2004/0068433 A1 | 4/2004 | Chatterjee |
| 2004/0072583 A1 | 4/2004 | Weng |
| 2004/0203572 A1 | 10/2004 | Aerrabotu et al. |
| 2004/0239498 A1 | 12/2004 | Miller |
| 2004/0266390 A1 | 12/2004 | Faucher et al. |
| 2005/0021369 A1 | 1/2005 | Cohen et al. |
| 2005/0070315 A1 | 3/2005 | Rai et al. |
| 2005/0085215 A1 | 4/2005 | Kokko et al. |
| 2005/0096070 A1 * | 5/2005 | Kanevsky ............... H04W 4/00 |
| | | 455/456.6 |
| 2005/0104745 A1 | 5/2005 | Bachelder et al. |
| 2005/0107673 A1 | 5/2005 | Ball |
| 2005/0111630 A1 | 5/2005 | Potorny et al. |
| 2005/0151642 A1 | 7/2005 | Tupler et al. |
| 2005/0187819 A1 * | 8/2005 | Johnson ............ G06Q 30/0273 |
| | | 705/14.42 |
| 2005/0221858 A1 * | 10/2005 | Hoddie .................. H04W 28/16 |
| | | 455/557 |
| 2005/0222933 A1 | 10/2005 | Wesby |
| 2006/0003775 A1 | 1/2006 | Bull |
| 2006/0033641 A1 | 2/2006 | Jaupitre et al. |
| 2006/0095331 A1 | 5/2006 | O'Malley et al. |
| 2006/0095349 A1 * | 5/2006 | Morgan .................... G01S 5/021 |
| | | 705/29 |
| 2006/0099969 A1 | 5/2006 | Staton |
| 2006/0099971 A1 | 5/2006 | Staton |
| 2006/0122767 A1 | 6/2006 | Athalye |
| 2006/0154642 A1 | 7/2006 | Scannell, Jr. |
| 2006/0163349 A1 | 7/2006 | Neugebauer |
| 2006/0194594 A1 | 8/2006 | Ruutu |
| 2006/0199196 A1 | 9/2006 | O'Banion |
| 2006/0253226 A1 | 11/2006 | Mendelson |
| 2006/0293024 A1 | 12/2006 | Benco et al. |
| 2007/0030144 A1 | 2/2007 | Titus et al. |
| 2007/0032225 A1 | 2/2007 | Konicek et al. |
| 2007/0032245 A1 | 2/2007 | Alapuranen |
| 2007/0033095 A1 | 2/2007 | Hodgin |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060697 A1 | 3/2007 | Edge et al. |
| 2007/0069923 A1 * | 3/2007 | Mendelson ........ G06Q 30/0239 |
| | | 340/988 |
| 2007/0161383 A1 | 7/2007 | Caei |
| 2007/0218895 A1 | 9/2007 | Saito |
| 2007/0268155 A1 | 11/2007 | Holmes et al. |
| 2008/0019268 A1 | 1/2008 | Rollins |
| 2008/0033805 A1 | 2/2008 | Padin |
| 2008/0045234 A1 | 2/2008 | Reed |
| 2008/0063153 A1 | 3/2008 | Krivorot et al. |
| 2008/0081646 A1 | 4/2008 | Morin et al. |

(56) References Cited

U.S. PATENT DOCUMENTS

| | | |
|---|---|---|
| 2008/0176583 A1* | 7/2008 | Brachet .................. H04W 4/029 455/456.3 |
| 2008/0194238 A1 | 8/2008 | Kwon |
| 2008/0208444 A1 | 8/2008 | Ruckart |
| 2008/0227473 A1* | 9/2008 | Haney ...................... H04W 4/02 455/457 |
| 2008/0280624 A1* | 11/2008 | Wrappe ................. G01S 5/0036 455/456.1 |
| 2008/0294058 A1 | 11/2008 | Shklarski |
| 2009/0006418 A1 | 1/2009 | O'Malley |
| 2009/0018766 A1* | 1/2009 | Chen ................... G01C 21/3611 701/533 |
| 2009/0247186 A1 | 10/2009 | Ji |
| 2009/0257345 A1 | 10/2009 | King |
| 2009/0322513 A1 | 12/2009 | Hwang et al. |
| 2010/0002846 A1 | 1/2010 | Ray et al. |
| 2010/0120447 A1 | 5/2010 | Anderson |
| 2010/0142402 A1 | 6/2010 | Boldyrev |
| 2010/0159976 A1 | 6/2010 | Marocchi et al. |
| 2010/0166153 A1 | 7/2010 | Guleria et al. |
| 2010/0202368 A1 | 8/2010 | Hans |
| 2010/0238018 A1 | 9/2010 | Kelly |
| 2010/0268449 A1* | 10/2010 | Feng .................. G01C 21/3682 701/533 |
| 2011/0086607 A1 | 4/2011 | Wang et al. |
| 2011/0093330 A1 | 4/2011 | Burckart |
| 2011/0103266 A1 | 5/2011 | Andreasen et al. |
| 2011/0110338 A1 | 5/2011 | Khoryaev |
| 2011/0134897 A1 | 6/2011 | Montemurro et al. |
| 2011/0153368 A1 | 6/2011 | Pierre et al. |
| 2011/0171912 A1 | 7/2011 | Beck et al. |
| 2011/0189980 A1 | 8/2011 | Proulx et al. |
| 2011/0195701 A1 | 8/2011 | Cook et al. |
| 2011/0201357 A1 | 8/2011 | Garrett et al. |
| 2011/0223931 A1 | 9/2011 | Buer |
| 2011/0244802 A1 | 10/2011 | Koziowski et al. |
| 2011/0263219 A1 | 10/2011 | Hasenfang et al. |
| 2012/0002792 A1 | 1/2012 | Chang |
| 2012/0023171 A1 | 1/2012 | Redmond |
| 2012/0029970 A1 | 2/2012 | Stiles et al. |
| 2012/0083998 A1 | 4/2012 | Kizaki |
| 2012/0084364 A1 | 4/2012 | Sivavakeesar |
| 2012/0092161 A1 | 4/2012 | West |
| 2012/0112895 A1 | 5/2012 | Jun |
| 2012/0144019 A1 | 6/2012 | Lhu |
| 2012/0188101 A1 | 7/2012 | Ganot |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0257729 A1 | 10/2012 | Piell |
| 2012/0264447 A1 | 10/2012 | Rieger, III |
| 2012/0289243 A1 | 11/2012 | Tarlow et al. |
| 2012/0295575 A1 | 11/2012 | Nam |
| 2012/0309341 A1 | 12/2012 | Ward |
| 2012/0310530 A1* | 12/2012 | Lee .................... G01C 21/3697 701/465 |
| 2013/0005295 A1 | 1/2013 | Park et al. |
| 2013/0030825 A1 | 1/2013 | Bagwandeen et al. |
| 2013/0046461 A1* | 2/2013 | Balloga ................. G01S 7/4972 701/438 |
| 2013/0083679 A1 | 4/2013 | Krishnaswarny |
| 2013/0084824 A1 | 4/2013 | Hursey |
| 2013/0090106 A1 | 4/2013 | Mathews |
| 2013/0113936 A1 | 5/2013 | Cohen |
| 2013/0122932 A1 | 5/2013 | Patel |
| 2013/0138791 A1 | 5/2013 | Thomas et al. |
| 2013/0183924 A1 | 7/2013 | Saigh et al. |
| 2013/0203373 A1 | 8/2013 | Edge |
| 2013/0203376 A1 | 8/2013 | Maier |
| 2013/0226369 A1 | 8/2013 | Yorio et al. |
| 2013/0237175 A1 | 9/2013 | Piett |
| 2013/0297195 A1 | 11/2013 | Das |
| 2013/0331055 A1 | 12/2013 | McKown et al. |
| 2014/0051379 A1 | 2/2014 | Ganesh et al. |
| 2014/0062724 A1 | 3/2014 | Varoglu et al. |
| 2014/0087680 A1 | 3/2014 | Luukkala et al. |
| 2014/0107917 A1* | 4/2014 | Kazawa ............. G01C 21/3632 701/457 |
| 2014/0113606 A1 | 4/2014 | Morken et al. |
| 2014/0126356 A1 | 5/2014 | Lee et al. |
| 2014/0148120 A1 | 5/2014 | Buck |
| 2014/0155018 A1 | 6/2014 | Fan et al. |
| 2014/0199959 A1 | 7/2014 | Hassan et al. |
| 2014/0248848 A1 | 9/2014 | Mufti et al. |
| 2014/0280091 A1* | 9/2014 | Nasarov .................. G06F 16/29 707/723 |
| 2014/0324351 A1 | 10/2014 | Dannevik et al. |
| 2015/0055453 A1 | 2/2015 | Chaki et al. |
| 2015/0081209 A1 | 3/2015 | Ych et al. |
| 2015/0109125 A1 | 4/2015 | Kaib et al. |
| 2015/0111524 A1 | 4/2015 | South |
| 2015/0137972 A1 | 5/2015 | Nepo et al. |
| 2015/0172897 A1 | 6/2015 | Mariathasan et al. |
| 2015/0289121 A1 | 10/2015 | Lesage et al. |
| 2015/0304827 A1 | 10/2015 | Price |
| 2015/0350262 A1 | 12/2015 | Rainisto et al. |
| 2015/0358794 A1 | 12/2015 | Nokhaudian et al. |
| 2015/0365319 A1 | 12/2015 | Finn |
| 2016/0004224 A1 | 1/2016 | Pi |
| 2016/0026768 A1 | 1/2016 | Singh et al. |
| 2016/0050550 A1 | 2/2016 | Anand et al. |
| 2016/0088455 A1 | 3/2016 | Bazik et al. |
| 2016/0219084 A1 | 7/2016 | Abiezzi |
| 2016/0219397 A1 | 7/2016 | Mayor et al. |
| 2016/0269535 A1 | 9/2016 | Balabhadruni et al. |
| 2016/0307436 A1 | 10/2016 | Nixon |
| 2016/0337831 A1 | 11/2016 | Piett |
| 2016/0345171 A1 | 11/2016 | Kulkarm |
| 2016/0363931 A1 | 12/2016 | Yang et al. |
| 2017/0004427 A1 | 1/2017 | Bruchal et al. |
| 2017/0140637 A1 | 5/2017 | Thurlow et al. |
| 2017/0142568 A1 | 5/2017 | Saito |
| 2017/0150335 A1 | 5/2017 | Seifer et al. |
| 2017/0161614 A1 | 6/2017 | Mehta et al. |
| 2017/0164175 A1 | 6/2017 | Bozik et al. |
| 2017/0171735 A1 | 6/2017 | Anand |
| 2017/0180486 A1 | 6/2017 | Mehta et al. |
| 2017/0180963 A1 | 6/2017 | Cavendish et al. |
| 2017/0180966 A1 | 6/2017 | Piett |
| 2017/0195475 A1 | 7/2017 | Mehta et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2018/0020091 A1 | 1/2018 | Self et al. |
| 2018/0242133 A1 | 8/2018 | Anand |
| 2020/0096345 A1* | 3/2020 | Jadav ...................... H04W 4/02 |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| JP | 9126804 A | 5/1997 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20150097031 A | 8/2015 |
| KR | 101602482 B1 | 3/2016 |
| KR | 20160097933 | 8/2016 |
| WO | WO 0167419 A2 | 9/2001 |
| WO | WO 2007109599 A3 | 12/2007 |
| WO | WO 2012129561 A1 | 9/2012 |
| WO | WO 2014025563 A1 | 2/2014 |
| WO | WO 2014074420 A1 | 5/2014 |
| WO | WO 2014176646 A1 | 11/2014 |
| WO | WO 2015127867 A1 | 9/2015 |
| WO | WO 2016044540 A1 | 3/2016 |

(56) References Cited

FOREIGN PATENT DOCUMENTS

| WO | WO 2017079354 A1 | 5/2017 |
| WO | WO 2017100220 A1 | 6/2017 |
| WO | WO 2017106775 A1 | 6/2017 |
| WO | WO 2017112820 A1 | 6/2017 |

\* cited by examiner

INDOOR AND OUTDOOR WAYPOINTS PROVIDING NAVIGATION AND OTHER INFORMATION AND METHOD OF USE

RELATED APPLICATIONS

This application is:

A) a Divisional Application of copending U.S. patent application Ser. No. 17/492,286 filed on Oct. 1, 2021, wherein U.S. patent application Ser. No. 17/492,286 is a Divisional Application of copending U.S. patent application Ser. No. 16/240,780 filed on Jan. 6, 2019, wherein U.S. patent application Ser. No. 16/240,780 is a Divisional Application of copending U.S. patent application Ser. No. 16/207,130 filed on Dec. 1, 2018, wherein U.S. patent application Ser. No. 16/207,130 is a Divisional Application of copending U.S. patent application Ser. No. 16/019,465 filed on Jun. 26, 2018, wherein U.S. patent application Ser. No. 16/019,465 is a Divisional Application of copending U.S. patent application Ser. No. 15/972,074 filed on May 4, 2018 (Issued as U.S. Pat. No. 10,117,078, issued on Oct. 30, 2018), wherein U.S. patent application Ser. No. 15/972,074 is a Divisional Application of copending U.S. patent application Ser. No. 15/953,389 filed on Apr. 13, 2018, wherein U.S. patent application Ser. No. 15/953,389 is a Divisional Application of copending U.S. patent application Ser. No. 15/687,445 filed on Aug. 26, 2017 (Issued as U.S. Pat. No. 9,961,507, issued on May 1, 2018), wherein U.S. patent application Ser. No. 15/687,445 is a Divisional Application of copending U.S. patent application Ser. No. 15/403,146 filed on Jan. 10, 2017 (Issued as U.S. Pat. No. 9,772,193, issued on Sep. 26, 2017), wherein U.S. patent application Ser. No. 15/403,146 is a Divisional Application of copending U.S. patent application Ser. No. 15/397,685 filed on Jan. 3, 2017 (Issued as U.S. Pat. No. 9,674,684, issued on Jun. 6, 2017), wherein U.S. patent application Ser. No. 15/397,685 is a Divisional Application of copending U.S. patent application Ser. No. 15/237,727 filed on Aug. 16, 2016 (Issued as U.S. Pat. No. 9,538,332, issued on Jan. 3, 2017), wherein U.S. patent application Ser. No. 15/237,727 is a Divisional Application of copending U.S. patent application Ser. No. 15/086,028 filed on Mar. 30, 2016 (Issued as U.S. Pat. No. 9,420,423, issued on Aug. 16, 2016), wherein U.S. patent application Ser. No. 15/086,028 is a Divisional Application of copending U.S. patent application Ser. No. 14/285,406 filed on May 22, 2014 (Issued as U.S. Pat. No. 9,604,193, issued on Mar. 21, 2017), wherein U.S. patent application Ser. No. 14/285,406 is a Divisional Application of copending U.S. patent application Ser. No. 14/285,332 filed on May 22, 2014 (Issued as U.S. Pat. No. 9,491,584, issued on Nov. 8, 2016), wherein U.S. patent application Ser. No. 14/285,332 is a Divisional Application of copending U.S. patent application Ser. No. 14/285,273 filed on May 22, 2014, (Issued as U.S. Pat. No. 9,204,257, issued on Dec. 1, 2015), wherein U.S. patent application Ser. No. 14/285,273 is a Divisional Application of copending U.S. patent application Ser. No. 14/285,209 filed on May 22, 2014, (Issued as U.S. Pat. No. 9,204,251, issued on Dec. 1, 2015), wherein U.S. patent application Ser. No. 14/285,209 is a Divisional Application of copending U.S. patent application Ser. No. 12/930,735 filed on Jan. 14, 2011 (Issued as U.S. Pat. No. 9,020,687, issued on Apr. 28, 2015), wherein U.S. patent application Ser. No. 12/930,735 is a Divisional Application of copending U.S. patent application Ser. No. 11/396,843 filed on Apr. 3, 2006 (Issued as U.S. Pat. No. 7,899,583, issued on Mar. 1, 2011), wherein U.S. patent application Ser. No. 11/396,843 is a Non-Provisional U.S. Patent Application claiming the benefit of U.S. Provisional Patent Application Ser. No. 60/670,097 filed on Apr. 12, 2005;

B) wherein U.S. patent application Ser. No. 14/285,209 is a Divisional Application of copending U.S. patent application Ser. No. 13/135,421 filed on Jul. 5, 2011 (Issued as U.S. Pat. No. 9,374,673, issued on Jun. 21, 2016), wherein U.S. patent application Ser. No. 13/135,421 is a Divisional Application of copending U.S. patent application Ser. No. 12/932,811 filed on Mar. 7, 2011 (Issued as U.S. Pat. No. 8,941,485, issued on Jan. 27, 2015), wherein U.S. patent application Ser. No. 12/932,811 is a Divisional Application of copending U.S. patent application Ser. No. 12/069,899 filed on Feb. 13, 2008 (issued as U.S. Pat. No. 7,924,149, issued on Apr. 12, 2011), wherein U.S. patent application Ser. No. 12/069,899 is a Divisional Application of copending U.S. patent application Ser. No. 11/472,706 filed on Jun. 22, 2006 (Issued as U.S. Pat. No. 8,896,485, issued on Nov. 25, 2014), wherein U.S. patent application Ser. No. 11/472,706 is a Divisional Application of copending U.S. patent application Ser. No. 11/429,864 filed on May 8, 2006 (Issued as U.S. Pat. No. 8,836,580, issued on Sep. 16, 2014), wherein U.S. patent application Ser. No. 11/429,864 is a Non-Provisional U.S. Patent Application claiming the benefit of U.S. Provisional Patent Application Ser. No. 60/678,947 filed on May 9, 2005, and C) wherein U.S. patent application Ser. No. 14/285,209 is a Divisional Application of copending U.S. patent application Ser. No. 12/587,042 filed on Oct. 1, 2009 (Issued as U.S. Pat. No. 8,866,876, issued on Oct. 21, 2014), wherein U.S. patent application Ser. No. 12/587,042 is a Divisional Application of copending U.S. patent application Ser. No. 11/429,864 filed on May 8, 2006 (Issued as U.S. Pat. No. 8,836,580, issued on Sep. 16, 2014), wherein U.S. patent application Ser. No. 11/429,864 is a Non-Provisional U.S. Patent Application claiming the benefit of U.S. Provisional Patent Application Ser. No. 60/678,947 filed on May 9, 2005; all of which are incorporated herein by reference.

FIELD OF THE INVENTION

This invention is directed generally to the field of "location based navigation" and, more particularly, to such method to be used indoors or outdoors without GPS and utilizing a wireless sensor network.

BACKGROUND OF THE INVENTION

Introduction to Location Based Services:

Location based services are rapidly expanding. Outdoor location technologies are mainly based on GPS technologies. GPS cannot perform properly indoors, and is therefore inadequate. As a result, indoor location systems are appearing on the market.

The need for a system, such as the indoor navigation system disclosed herein, arises from various market segments and applications. One example in the market is the GPS based systems that use integrated positioning and navigation systems based on GPS receivers as the primary positioning technology. Subsequent to the events of September 11th, the Federal government mandated that GPS capability be built in to all cellular phones. However, the fact that uninterrupted satellite reception is not possible in many locations is a major limitation of GPS based systems. Densely populated areas and radio-frequency-signal shadowed locations, such as urban centers (a.k.a. "urban canyons"), generally do not allow proper operation of GPS, yet it is in these locations that the need is greatest.

There is a clear need for a cost effective system that maintains performance indoors, in urban canyons and in city centers.

Another important consideration is that GPS itself is susceptible to jamming and other man-made interference.
Description of GPS System.

The Global Positioning System (GPS) is a satellite-based navigation and time transfer system developed by the U.S. Department of Defense. GPS serves marine, airborne and terrestrial users, military and civilian. Specifically, GPS includes the Standard Positioning Service (SPS) that provides civilian users with 100 meter accuracy as to the location or position of the user. For military users GPS provides the Precise Positioning Service that is accurate to within 20 meters. Both of these services are available worldwide with no requirement for any local equipment.
View of GPS Limitations:

First limitation of GPS is that upon activation the GPS receiver scans for signals from the GPS satellites. A unit must locate and receive signals from at least four satellites to be able to determine its location. This process of locating the satellites, receiving the data and achieving a position fix can take several minutes. This delay is problematic for many GPS applications.

Second limitation of GPS is that the receiver needs a clear view of the sky to successfully receive signals from the satellites, again under unfriendly RF conditions such as inside buildings, or in "urban canyons" or in the shadows of high buildings, the GPS suffers from multi-path effects and therefore shows poor performance, or none at all.

Third Limitation—limited accuracy: There is a problem of limited accuracy of the civilian GPS signal. While knowing your position to within 50 to 200 feet anywhere on the planet is a major technological feat, it is still not accurate enough, to locate and navigate to an a store in a mall or to empty parking space, where each space measures about 10 feet, and most indoor store/malls are located where the GPS cannot work effectively.

Existing navigation systems, such as the new mandatory GPS equipped cellular phones, are based on GPS and have the aforementioned limitations.

Another significant factor adding to the limitations of the GPS based systems is the important role of map production; normally a user, requires a map to be as detailed and as up-to-date as possible. The existing maps used by the GPS based systems provide limited detail and are not able to reflect changes on a real time basis, more over there is no mapping for indoor facilities at all. The recent introduction of imagery services, such as Google Earth and its competitors, that are offered as an enhancement to GPS at a fee, still provide out of date information, with the unsatisfactory result that users encounter road changes and area development not shown on the maps and imagery.
Application:

In general, the disclosed system is based on applying machine-learning techniques to the task of inferring aspects of the user's status from a stream of input from sensors.

The system focuses on indoor navigation, or navigation in crowded urban areas, where GPS based systems, due to lack of access to satellites or the GPS limitations detailed previously, cannot achieve the required results.

The system have focuses on the task of interactively guiding the user to a desired indoor destination.
Examples of Indoor Applications:

The user may wish to locate an empty available parking space in his vicinity.

The user may wish to locate a specific store in a shopping mall, or a particular aisle in a department store, or a specific item on a shelf.

The user may wish to locate a specific conference room in a convention center, or a point of interest in an amusement park or a point of interest in a museum.

The user may be looking for a train location in a station, or stops in a subway or underground train system.

PRIOR ART

At the present time, no prior art device utilizes the capabilities to display a real-time representation of navigating directly from the sensors without a central system; and without using a Global Positioning System (GPS) based system directly to the "user". Also most of systems are designed for the old query type search where interface to Internet and or database central system needed The system disclosed herein automatically detects a signal directly from the sensors, no communication needed not even cellular communication. Other systems must have bandwidth available, over which to send a request to a central system, or to a database, and then must wait for a response. This takes time!

Even if the other systems have bandwidth, they still based on the existing search concept where under the user submits a query, searches and awaits for the response. All of this is impractical. The system disclosed herein provides the information automatically, without submitting any query, and the response is according to the user's location.

Again, most of the existing prior art is based on either a GPS based system or an existing GPS based car navigator.

And the existing mapping that these systems use has the same limitations described previously and is impractical.

It is believed that the disclosed system and associated method bridges the gap between the GPS based navigation and provides a complete solution.

U.S. Pat. No. 7,031,875 Ellenby et al. describe a pointing system for addressing objects, provide a system and method based on GPS and Internet/database communication, it is not exactly a navigation but a information based system that need the GPS to locate the user location so indoor services is likely out of the question and the need for communication as well with GPS limit its availability and accuracy.

Indoor Location Technologies.

Various technologies are used for wireless indoor location. These may be classified in two aspects: The algorithm—i.e. the method of location used. The physical layer—i.e. the wireless technology used to communicate with the mobile device.

Location Methods

Typically, the methods used in indoor locations are "borrowed" from the outdoor GPS location methods inventory. Specifically, four types of methods are used indoors:
  Proximity Detection (PD),
  Received Signal Strength (RSSI),
  Time of Arrival (TOA), and
  Angle of Arrival (AOA).

Proximity Detection (PD)

This method relies upon a dense grid of antennae, each having a well-known position. When a mobile is detected by a single antenna, it is considered to be collocated with it. When more than one antenna detects the mobile, it is considered to be collocated with the one that receives the strongest signal.

This method is relatively simple to implement. It can be implemented over different types of physical media. In particular, IR and RFID are based on this method.

Triangulation

Triangulation takes PD a step further, in the sense that it is based on measuring the signal level measurements from each antenna (possibly by using a triangulation mechanism), with respect to each mobile device. Following that, mobile is located by using a triangulation algorithm.

Like the PD method, triangulation is relatively simple to implement.

Time of Arrival (TOA)

TOA is based on triggering the mobile devices to respond, and measuring the time it takes for the response to transmit back to the antenna. The elapsed time represents the distance between the two. By using distances from few antennas, a mobile's position can be triangulated. TOA is considered to be the most accurate method, because multipath effects can be filtered out. Yet, it is considerably more complex to implement, as it requires a modification to the hardware on the mobile side, as well as special modifications on the antenna side.

Angle of Arrival (AOA)

AOA is based on finding the direction of maximal signal intensity for each antenna-device pair. By finding the intersection of several such direction vectors, a mobile's position can be estimated AOA is considerably less accurate than TOA, due to limited angular resolution and the fact that indoors much of the signal is reflected. Also, AOA antennae are more complex, as they require multi-section, highly directional antennas, and multiple RF circuitry.

WLAN (IEEE 802.11b)

This midrange wireless local networking standard, operating in the 2.4 G Hz ISM band, has become very popular in public hotspots and enterprise locations during the last few years. With a typical gross bit rate of 11 Mbps and a range of 50-100 m, IEEE 802.11b is currently the dominant local wireless networking standard.

It is therefore appealing to use an existing WLAN infrastructure for indoor locations as well, by adding a location server. Such solutions do exist in the market, providing an accuracy of approximately two (2) meters.

One limitation of such systems is the fact that WLAN tags are relatively bulky and power hungry. Thus, such locators are mainly useful to locate WLAN enabled instruments, such as portable computers.

Note that in WLAN, antennae are actually part of access points (APs), through which devices communicate with the access network. This is also the case with Bluetooth.

Bluetooth (IEEE 802.15)

Bluetooth is a newer wireless local networking standard, that operates in the 2.4 GHZ ISM band. Compared to WLAN, the gross bit rate is lower (1 Mbps), and the range is shorter (typically 10-15 m, although there are tags with a range of over 300 feet). On the other hand, Bluetooth is a "lighter" standard, highly ubiquitous (embedded in most phones, PDAs, PC peripherals, etc.), and supports, in addition to IP, several other networking services. Notably, Bluetooth supports serial port emulation, voice, and various types of object exchange. Bluetooth tags are small, pocket-size transceivers.

Every Bluetooth device's tag has a unique ID. This ID can be used for locating the tag.

Bluetooth Indoor Location.

How does Bluetooth location work?

Bluetooth was not made originally for location. From the outset, the standard was designed for communication, in a personal area networking (PAN) environment. However, to facilitate this task, particularly in dynamic ad-hoc scenarios, devices need a mechanism to identify their neighbors, to synchronize, and finally to connect. Such mechanisms have indeed been built into Bluetooth. More importantly, these mechanisms can also be used to obtain an accurate location.

There are two approaches to Bluetooth location:

Binary location—a room-oriented approach, uses the PD method. An access point is installed in every way point. For each tag, the system than finds the nearest AP, and respectively indicates its way point location.

Analog location—an X-Y oriented approach, based on the RSSI method. APs are installed more sparsely (typically, 10-15 meters apart). For each tag, the distance from each way point is measured, and the system triangulates the tag's position.

An AP finds a tag by using one of two Bluetooth mechanisms, Inquiry and Paging, that are used normally for link setup:

The Inquiry mechanism—provides a way for a Bluetooth device to discover its neighbor's Bluetooth ID. An inquiry process typically takes 5 seconds. It concludes with the inquirer (typically the AP) having the IDs of all those Bluetooth devices (tags) within its RF range. The relevant location scenario is that of browsing all tags nearby.

The Paging mechanism—following an inquiry, the inquirer can page (set up a link with) one or more of its discovered neighbors. A paging process typically takes 1-2 seconds. This mechanism is faster, but requires a previous knowledge of the tag's ID (as well as the Bluetooth clock phase). The relevant location scenario is that of searching for a certain tag. It is the most accurate and the faster response time and it is the disclosed method in door navigation when and where each tag is known address position-waypoint.

Why use Bluetooth for indoor location?

Bluetooth has some advantages in the context of indoor location. These include:

Bluetooth uses RF—in the 2.4 GHz ISM band, specifically. In this frequency range, radio waves penetrate obstacles, such as walls and human bodies, albeit with a substantial loss.

This has two implications:

Availability is high—there is always some signal received by the access point.

AP density can be low the access points can be placed relatively far apart (typical range is 10-15 meters, i.e. not necessarily of one in each way point).

Bluetooth is ubiquitous—Bluetooth chipsets are being implanted everywhere nowadays (phones, accessories, computing devices, etc).

The fact that a Bluetooth location system can locate any Bluetooth enabled device, makes it more cost-effective. This means that an increasing fraction of humans and mobile assets around would become locatable in a Bluetooth covered site, with no additional hardware cost (no tags attached). The only need is to pre-register these devices. Bluetooth is a low power technology—tags need recharge, approx. once a week (or longer, depends on the usage scenario). Non tags (e.g. Bluetooth enabled phones), are being recharged anyway on a regular basis, so they do not need special recharges. If they are being used for location, the fraction added to their usual (no Bluetooth) power consumption is relatively small.

Bluetooth is a low cost technology—the high expected production volumes (hundreds of millions annually) lead to sub-$5 per chip. This goal has already been met by a few integrated circuit (IC) manufacturers. This would eventually result in a low price for the Bluetooth tags, if and when Bluetooth location systems would become sufficiently ubiquitous. Bluetooth is a multi-functional communication standard-location is only one of the services that can be supported by a Bluetooth infrastructure. The same infrastructure can be used to provide additional network services, particularly remote monitoring and control (by using a serial interface). In addition, Bluetooth provides voice and IP services (although for the later, WLAN is typically more suitable).

In open spaces, relatively free of obstructions and walls (e.g. A large warehouse or a public hotspot), Bluetooth alone would suffice to provide an approximate 2 meter error range.

CONCLUSION

The Bluetooth technology offers two unique advantages: one is the ability to locate ubiquitous "any tags" (any Bluetooth enabled device that is not a tag, e.g. most of the newer mobile phones). The other advantage is the multiservice nature of the Bluetooth infrastructure that enables using the location access points for other purposes, such as for navigating, remote monitoring and control, and for a variety of IP and messaging services.

SUMMARY OF THE INVENTION

In accordance with the present invention, these are the disclosed system or project's characteristics:

The disclosed system is a navigation method based on the following unique characteristics:

In an indoor or outdoor navigation situation, the associated sensor network, and sensor tags, replaces the satellites in a GPS based system, to provide the user with the information and directions needed to reach the destination.

The disclosed innovation has three major parts:

The navigator, the special method used to display the data and the sensors.

It is not a location and tracking system as offered by other systems.

Small RF tags are installed in each place designated as point of interest, be it at a mall, department store, product inside a store, street or garage parking, inside or outside location, public or commercial. The tags can be RFID (long range type), or a long range Bluetooth, or a Wi-Fi or any RF type. The tags broadcast a unique ID by wireless that identifies the location by the unique ID, the address and type of facility/store. The tag broadcasts its information to be picked up by the navigator, by the cellular phone or any other Bluetooth device application.

The system can serve as add on to the mall/store's guide/mapping to provide extra assistance to user.

The Navigator.

The navigator, cellular phone application Bluetooth application

The user will receive the data broadcast by the tags in the vicinity via the interface with a cellular telephone utilizing the cellular phone's Bluetooth capability. It is important to note that no cellular communication or Internet or database access is needed, and that any Bluetooth enabled device will operate the disclosed navigator application as a stand alone device. The disclosed system will interface with existing in-car navigation systems.

The Display Method.

The display method is the disclosed unique way to bridge existing devices like cellular phones, in-car navigation and other Bluetooth devices. The system provides an overlay navigation display method over the existing navigation system, as a real-time floating display, or as a waypoint to overcome the limitations of GPS based systems and the existing mapping systems.

Mapping can be offered as an additional service. No regenerating of mapping is necessary.

The disclosed navigation system method will enable remote planning based on downloaded local floor-plans, or local navigation, when the location's floor plan can be downloaded at the destination. An example of this would be at the entrance of a shopping mall, department store, amusement park, museum, parking garage or the down town area of a city.

The disclosed system is based on a network of sensors/tags that can be deployed anywhere. The system is accurate to within 10 feet, significantly better existing navigation systems and GPS. The system can work inside a building whereas GPS cannot.

Local detection is obtained via popular Bluetooth interface.

The system provides information about each facility/store, including information about the type of the facility, for example: type of store or product etc.

By providing the ability to locate a the user in an area using a Bluetooth enabled device, or a cell phone with the associated navigation application, the system overcomes the anxiety of "Where will I am" and also facilitates finding a parked car later via the RTP (Return to Parking) feature.

The system has the capability to perform all the functions of a search for and can become the "Next generation search out of the box".

The disclosed system can be an attractive additional feature for cities that intend to deploy WIFI.

In case of an emergency or security situation, the system can provide authorities with information.

The system eases facilitates navigation to indoor locations, without a navigation map or GPS. Mapping background can be provided as an additional feature on the disclosed system. The system provides "local" navigation as well as "remote" detection.

The system allows easy interface with existing networks.

The system saves gas, time, money and eases global warming by reducing the time spent searching for destination.

The disclosed navigation method is unique. The base of the disclosed system utilizes RF tags with interface to Bluetooth enabled devices. This feature allows detection and navigation in locations where GPS cannot work, as well as outside, with the ability to guide the user to within 10 feet of the destination, significantly better than any other navigation and GPS based systems on the market.

The Bluetooth/RF tags are based on a long range version of the popular short distance communication. This unique feature affords the user the ability to plan ahead from a remote location, by obtaining data about the destination directly from the tags and by accessing the indoor floor plan to be navigated at the destination.

A major problem with In-Car navigation and GPS mapping is that they cannot guide the user closer than 50 to 200 feet, and only in open places. The disclosed system can provide accurate directions to within 10 feet.

The disclosed system will be a challenge to navigation providers and GPS providers as they cannot provide mapping or navigation inside a mall, department store, a parking garage or lot, and anywhere the GPS/Navigation map cannot accurately help navigate.

Utilizing the disclosed innovation the facilities in the vicinity around the "user" car are displayed on a floating overlay using either a cellular phone application, or a stand-alone device, or an existing installed navigation system with or without any mapping.

The recent introduction of imagery services, such as Google Earth and its competitors, that are offered as an enhancement to GPS at a fee, still provide out of date information, with the unsatisfactory result that users encounter road changes and area development not shown on the maps and imagery.

Navigation using the mapping or floor-plan of a location can be offered as an additional service. The option of downloading a floor-plan can be exercised either remotely or locally.

The tags broadcast their signal continuously and any of the disclosed navigation devices will detect them and display the data on the user's device in an easy to understand method.

With the disclosed innovation you have the information that you want, when you want it, where you want it. (and at an affordable price).

Once you are in the vicinity of your destination and you switch on your navigation device, you will automatically receive the facility information along your waking route and in all directions around you.

No further action is required, there is no need to send a request or to access the Internet/web or log on and search a database or central system. Other systems must have bandwidth available, over which to send a request to a central system, or to a database, and then must wait for a response. This takes time!

Even if the other systems have bandwidth, they are still based on the existing search concept where under the user submits a query, searches and awaits for the response. All impractical while the user need the information immediately. The disclosed system provides the information automatically, without submitting any query, and the response takes into account the user's location.

The unique approach of the disclosed system does not need an Internet bandwidth or cellular communication at all.

And as a result there is no delay or waiting for communication and access time, the communication is instantaneous, directly between the tags and the user's navigation device.

Additionally, each facility type can color-coded to identify the type of the store etc., e.g. restaurants, men's wear, women's wear etc.

Each color-coded display of facility can be accessed to obtain complete information about the store e.g., automatic waypoint information.

The ability to operate the disclosed innovation using the associated application on a cellular phone, the navigator, with no need for cellular connection, or on any stand alone Bluetooth enabled device, means the user does not need any GPS system.

Moreover, the disclosed innovation can solve the "RTP" (Return to parking) problem, where many forget where they parked their car. The system has an option to save the location on the "cellular phone-parking detector" application, that will make it easy to locate the parked car.

The disclosed solution is designed for global use and is not limited to malls, stores, amusement parks, museums, sports stadiums etc. It can be implemented in parking garages or parking spaces metered or not, almost anywhere and in any place In the future, all new construction could have the tags included in the design.

The disclosed system integrate the navigation as part of the NAV4 concept where it will provide complete solutions for local navigation in an area where the GPS can't work.

The disclosed system and method consists of three parts:

Part 1. A network of tags/sensors—each in a known location.

The disclosed system is based on navigation to a location, and its aim is to replace or supplement the mall/store guide/map, by installing the tags/sensors in each store or point of interest.

Part 2. The mapping. As GPS and GPS mapping is not available indoors, the disclosed system and method utilizes floor plan mapping available from each facility. For planning ahead, the floor plan can be downloaded to the user's navigation/cellular phone remotely—via the Internet before reaching the destination or locally via Bluetooth when the destination is reached.

Part 3. The Navigation uses the most commonly used device in the world today, the cellular phone with Bluetooth interface. The disclosed system method doesn't need any connection, communication, Internet or central system nor any cellular communication.

As a difference from other systems and other local based systems, the disclosed system offers a unique approach that can be described as the "Search out of the box" as neither query nor database search is needed; all communication is directly between the sensor/tags and the cellular phone, working as a Bluetooth device, that automatically recognizes and takes into account the "user's" location, and provides instant information.

A typical application is navigating a pedestrian in an environment like a mall, department store, specialty store, conference, trade show, amusement park, university, hospital, school, municipal building, museum, subway, train station, airport, down town center, any type of parking facility, or any place when and where GPS cannot be provided or is not accurate or precise enough. The system will be used for navigation by first responders to emergencies or disasters.

The disclosed system method is part of a broad suite of applications that include a complete solution to the "user" from the time that they park, or begins to look for a space to park their car, walking to the store/mall to when they wants to return to their parked car, looking for the place that they parked.

The suite includes:
Parking detector—and navigation to the empty available parking space.
Nav4 mall/store navigation solution inside mall store.
RTP—return to parking—locate the place that you parked your car.
For example, a typical application could be:
A pedestrian asks the way in a mall to a specific store.
A pedestrian asks the way inside the store, to a specific aisle or product.
A shopper in a department store asks for a specific department.
A pedestrian asks the way to a point of interest. In an emergency, the first response team has to navigate inside a smoke filled building.

A system and method to provide user information that relates to the point of interest. The disclosed system provides detection and navigation reference, position determination and information related to the object—point of interest, directly and automatically to the user interface-cellular phone without any communication help of Internet/web or cellular needed.

Special operation mode:—Shopping-NAV4SALE—provides navigation to the special sale item in a department store.

Special operating mode:—Museums—NAV4Museums provides navigation and interactive information from the museum's exhibition to the "user's" cellular phone device via Bluetooth interface.

Special operating mode:—Parking—NAV4PARKING provides empty parking space detection and navigation.

Special operating mode:—NAV4STORE provides navigation inside a store/department store to a specific department/aisle or specific product, with option for advertising method and special promotion.

Bluetooth Indoor Location:
How does Bluetooth location work?
Bluetooth was not made originally for location. From the outset, the standard was designed for communication, in a personal area networking (PAN) environment. However, to facilitate this task, particularly in dynamic ad-hoc scenarios, devices need a mechanism to identify their neighbors, to synchronize, and finally to connect. Such mechanisms have indeed been built into Bluetooth. More importantly, these mechanisms can also be used to obtain an accurate location.

There are two approaches to Bluetooth location:
Binary location—a room-oriented approach, uses the PD method. An access point is installed in every way point. For each tag, the system than finds the nearest AP, and respectively indicates its way point location.

Analog location—an X-Y oriented approach, based on the RSSI method. APs are installed more sparsely (typically, 10-15 m apart). For each tag, the distance from each way point is measured, and the system triangulates the tag's position.

An AP finds a tag by using one of two Bluetooth mechanisms, Inquiry and Paging, that are used normally for link setup:

The Inquiry mechanism—provides a way for a Bluetooth device to discover its neighbor's Bluetooth ID. An inquiry process typically takes 5 s. It concludes with the inquirer (typically the AP) having the IDs of all those Bluetooth devices (tags) within its RF range. The relevant location scenario is that of browsing all tags nearby.

The Paging mechanism—following an inquiry, the inquirer can page (set up a link with) one or more of its discovered neighbors. A paging process typically takes 1-2 seconds. This mechanism is faster, but requires a previous knowledge of the tag's ID (as well as the Bluetooth clock phase). The relevant location scenario is that of searching for a certain tag. It is the most accurate and the faster response time and it is the method indoor navigation when and where each tag is known address position-waypoint.

Why use Bluetooth for indoor location?
Bluetooth has some advantages in the context of indoor location. These include:

Bluetooth uses RF—in the 2.4 GHz ISM band, specifically. In this frequency range, radio waves penetrate obstacles, such as walls and human bodies, albeit with a substantial loss. This has two implications:

Availability is high—there is always some signal received by the access point. AP density can be low the access points can be placed relatively far apart (typical range is 10-15 meters, i.e. not necessarily of one in each way point).

Bluetooth is ubiquitous—Bluetooth chipsets are being implanted everywhere nowadays (phones, accessories, computing devices, etc). The fact that a Bluetooth location system can locate any Bluetooth enabled device, makes it more cost-effective. This means that an increasing fraction of humans and mobile assets around would become locatable in a Bluetooth covered site, with no additional hardware cost (no tags attached). The only need is to pre-register these devices.

Bluetooth is a low power technology—tags need recharge, approx. once a week (or longer, depends on the usage scenario). Non tags (e.g. BT enabled phones), are being recharged anyway on a regular basis, so they do not need special recharges. If they are being used for location, the fraction added to their usual (no Bluetooth) power consumption is relatively small.

Bluetooth is a low cost technology—the high expected production volumes (hundreds of millions annually) lead to sub-5$ per chip. This goal has already been met by few IC manufacturers. This would eventually result in a low price for the Bluetooth tags, if and when Bluetooth location systems would become sufficiently ubiquitous.

Bluetooth is a multi-functional communication standard-location is only one of the services that can be supported by a Bluetooth infrastructure. The same infrastructure can be used to provide additional network services, particularly remote monitoring and control (by using a serial interface). In addition, Bluetooth provides voice and IP services (although for the later, WLAN is typically more suitable).

In open spaces, relatively free of obstructions and walls (e.g. A large warehouse or a public hotspot), Bluetooth alone would suffice to provide an approximate 2 meter error range.

Waypoint Navigation

A waypoint is a fixed location with known address location, longitude and latitude and coordinates. The disclosed navigation system is capable of storing a database of waypoints for the following purpose:

Waypoints mark a destination, a point along the way to a destination, or a point of reference. Normally, in navigating, a "route" consists of one or more waypoints. To traverse a route, the user navigates to the nearest waypoint, then to the next one in turn until the destination is reached. The system has the ability to compute a great-circle route towards a waypoint, enabling them to find the shortest route even over long distances. The system enabling users to locate a destination on a map and define it as a waypoint. The system is intended for navigation; it can generate a suggested route between two waypoints, based on the cartographic database. The system indicates the user's current location and gives advance notice of an upcoming point.

Because the system knows the waypoint positions, and the distance between them it, it is easy to determine the "user's" exact location.

Map Matching

The navigation solution is further enhanced, although it is not essential, when the system knows that the person or object being located is traveling along known routes on a map; for example, the system can assume that people can only follow certain routes in a mall. This is priori information that can be used to "force" the estimated position to be on the nearest point on the possible routes. The constraints of indoor construction similarly can be used to refine estimates of the position of a person or object moving within a building-people and objects do not pass through walls, they pass along corridors and through doorways. It is a best solution for a system in case of an emergency or for a system for homeland security or a system to locate and inform the subway location, a good example is the hotel exit floor map.

Configuration and Use

In the disclosed indoor application, instead of GPS, the disclosed system uses known waypoint positions that are manually detected and identified as a demonstration of the concept of using another sensing method, such as RFID, to detect and identify the waypoints. Theoretically, it would be possible to convert the waypoint positions into GPS coordinates and emulate an external GPS data source.

This system can be useful for providing navigation to first responder personnel indoors waypoints have been installed in a particular building in the form of RFID tags whose identities are associated with locations, then it may be possible to associate magnetic anomaly information with individual tags as well.

One of the important features of the disclosed indoor navigation techniques will enhance the ability of tactical team's first response team to navigate within the buildings in which it has been deployed. RF (Bluetooth) Tag/Sensor devices commonly are attached to persons or to moveable objects so that the objects can be tracked using fixed readers (special-purpose radios) at different locations. This is the most common indoor navigation that exists today. The disclosed method is the "flip side" of this practice and is based on the concept that the detection of an RF (Bluetooth) device, or RF Tags, in a known, fixed location, by a moving reader, such as a Bluetooth enabled cellular phone or other Bluetooth enabled device, provides a precise location of a person or a moving object, by the carrier of the telephone or device, who can supply indoor navigation without GPS.

The disclosed method provides a low-cost, reliable system for firefighters and other first responders, inside buildings, to navigate, where a GPS is not reliable-indeed, the GPS signal may have been disabled temporarily to prevent exploitation by terrorists, or even more likely no signal can be received at all inside a building.

The disclosed system envisions this limitation of GPS based systems, and is intended for an environment that is potentially much less "friendly" to RF signals, the environment inside a building that first responders encounter may contain smoke, dust, or flames, and is intended to leverage advances in ubiquitous RF/Bluetooth tag technology. The disclosed system will exploit the capability of storing critical building information, such as the floor maps and the emergency escape plans, for retrieval and navigational assistance via a Bluetooth enabled cellular phone, when and where it is needed, More over the disclosed system can serve as a navigator for the emergency exit route when and where needed each user can load the emergency exit floor plan and escape with the knowledge of his exact location in that route.

Aspects of the scenarios to be included:
Identifies and tracks the user (a first response team member).
Provides the user with navigation information and directions for safely exiting of the building.
Provides location information of all team members, via an ad hoc network of radio terminals that combine RF/Bluetooth readings and radio communication.

From the outset, the disclosed system was been designed with the capability to utilize existing technology so it can be deployed as a stand-alone system, or in tandem with existing systems. The disclosed solution focused on technology already in place that simply needs to be expanded.

With the implementation of the disclosed system, a FIRST RESPONSE TEAM will be empowered to navigate and find its way in a case of emergency or a disaster. This capability can be a critical life saving power in modern congested urban living conditions, not available before now.

It is believes that implementation of the disclosed system will assist counter terrorism activities and more importantly will help the first response teams to save the lives of people trapped inside buildings.

CONCLUSION

The Bluetooth technology offers two unique advantages: one is the ability to locate ubiquitous "any tags" (any Bluetooth enabled device that is not a tag, e.g. most of the newer mobile phones).

The other advantage is the multiservice nature of the Bluetooth infrastructure that enables using the location access points for other purposes, such as for navigating, remote monitoring and control, and for a variety of IP and messaging services.

BRIEF DESCRIPTION OF THE DRAWINGS

A better understanding of the present invention may be obtained by reference to the accompanying drawings, which should be considered in conjunction with the detailed description, all in accordance with the present invention.

DESCRIPTION OF THE PREFERRED EMBODIMENT

Figure 1:
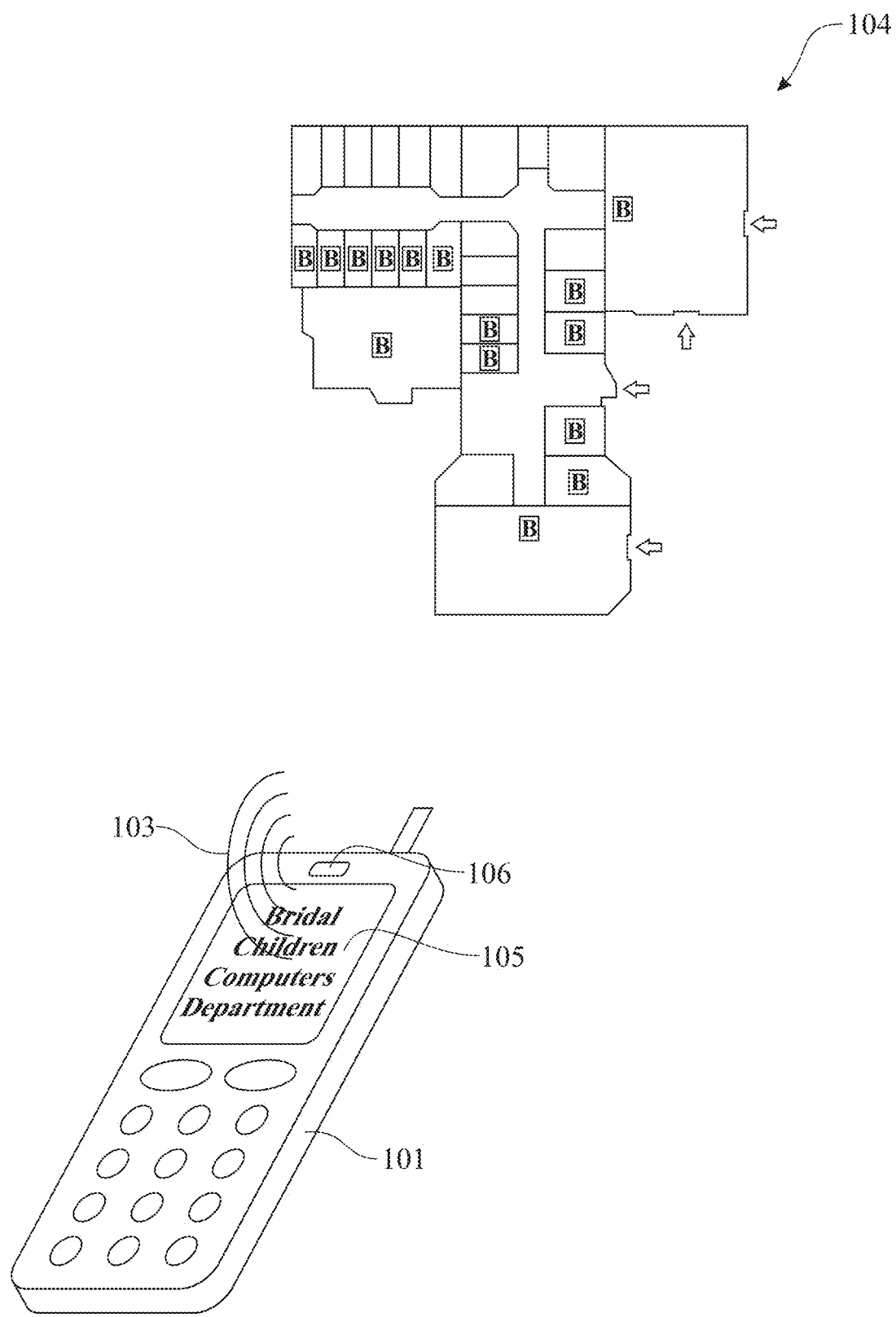
FIG. 1 is an illustration of the portable phone navigation method as application on a cellular phone in accordance with the present invention.

In all the figures of the drawings, sub-features and integral parts that correspond to one another bear the same reference symbol.

Referring now to the drawings in detail and first particularly to FIGS. 1-8 thereof.

These figures illustrate the method and system to navigate indoor without GPS using sensor in a network utilizing Bluetooth application on a cellular phone.

Referring to FIG. 1 This shows the cellular phone 101 with a floating display of information 105 received directly from sensors/tags 107 installed in this illustration in a mall facility 104 the only communication is between the sensors 107 and directly to the cellular phone 101 via a Bluetooth communication 102 where no cellular or any other connection needed at all. The system uses the cellular phone 101 as a Bluetooth enable device. The application will receive a signal directly from the sensor/tags 107 installed at the facility and allow to calculate and determine the exact location of the "user" and will allow navigation in the facility when the navigation display 105 of the application will be floating on the floor map of the facility that can be down load ether remotely before accessing the facility or locally via Bluetooth 102 when reaching the area.

Each sensor 107 represents a waypoint and will be shown with a simple color code to identify the type of the facility e.g. type of store.

When the user approaches a sensor/tag/way point 107 he will be able to receive additional-information regarding the store/product on his cellular phone/Bluetooth device 101 e.g. special promotions, coupons, advertising or special sales to the display 105 etc.

The promotion can be also delivering via Bluetooth voice option 106.

Figure 2:
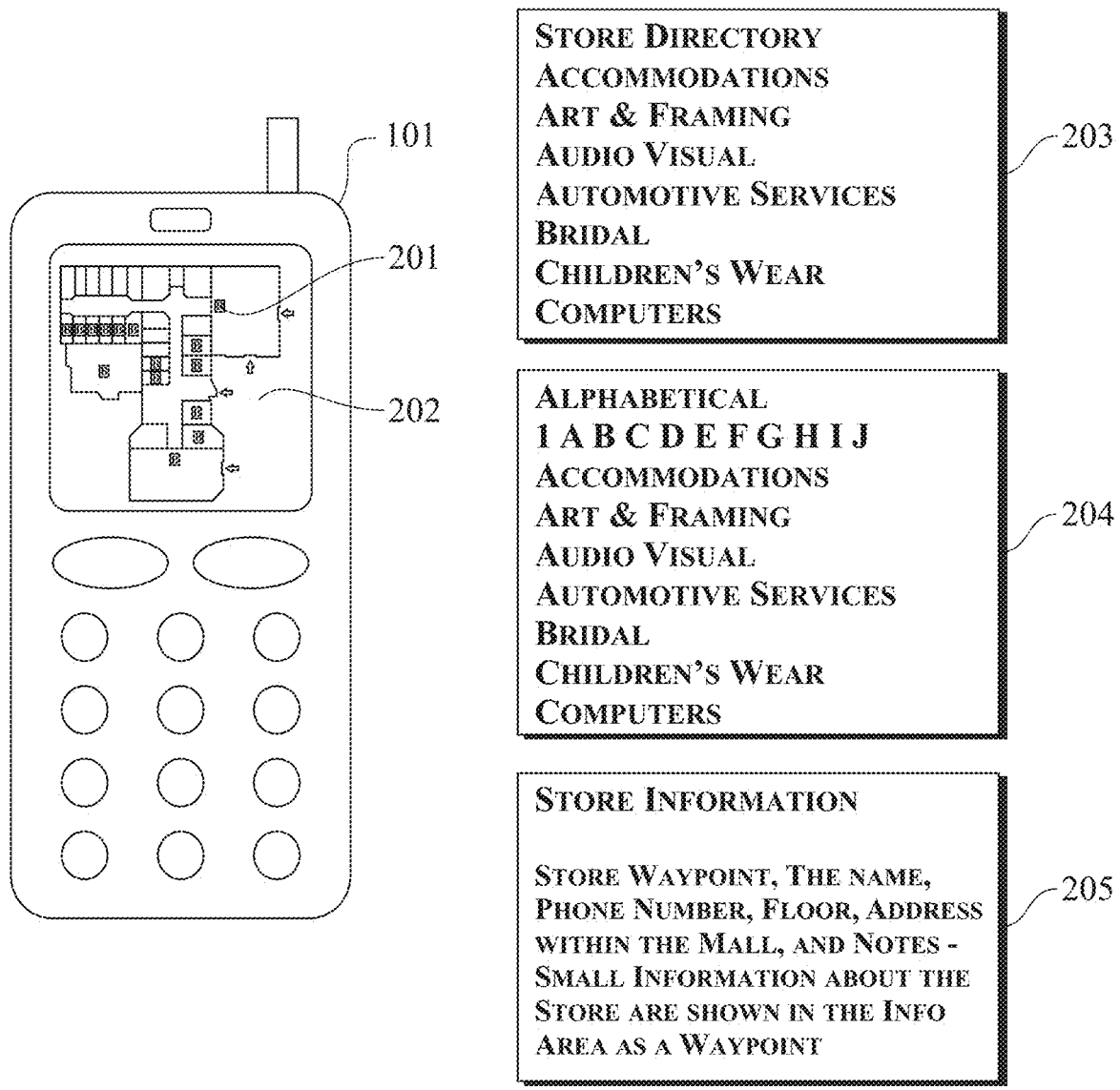
FIG. 2 is illustration of the portable phone navigation as an application nav4 mall/store in accordance with the present invention.

Referring to FIG. 2. This figure illustrate the cellular navigation application in a mall on a cellular phone, 101, as a Bluetooth cellular phone application; again, there is no need for cellular communication or any Internet web communication or any central system nor any access to a database.

The system utilizes the cellular phone, 101, only as a Bluetooth enabled device and the application overlay floating display over the floor map 201 where each store sensor/tag 202 represented as a waypoint, in this illustration the mall's store can be view and be search by store type, store directory 203, or by alphabetical order 204, where each store/waypoint will have a basic information-store information 205, like the store name, phone number, floor, address within the mall, and a small notes-small information representing the store. Again when the user approaches a sensor/tag/way point 202 he will be able to receive additional information regarding the store/product on his cellular phone/Bluetooth device 101 e.g. special promotions, coupons, advertising or special sales to the display 201 etc.

The promotion can be also delivering via Bluetooth voice option utilize the Bluetooth options.

Figure 3:
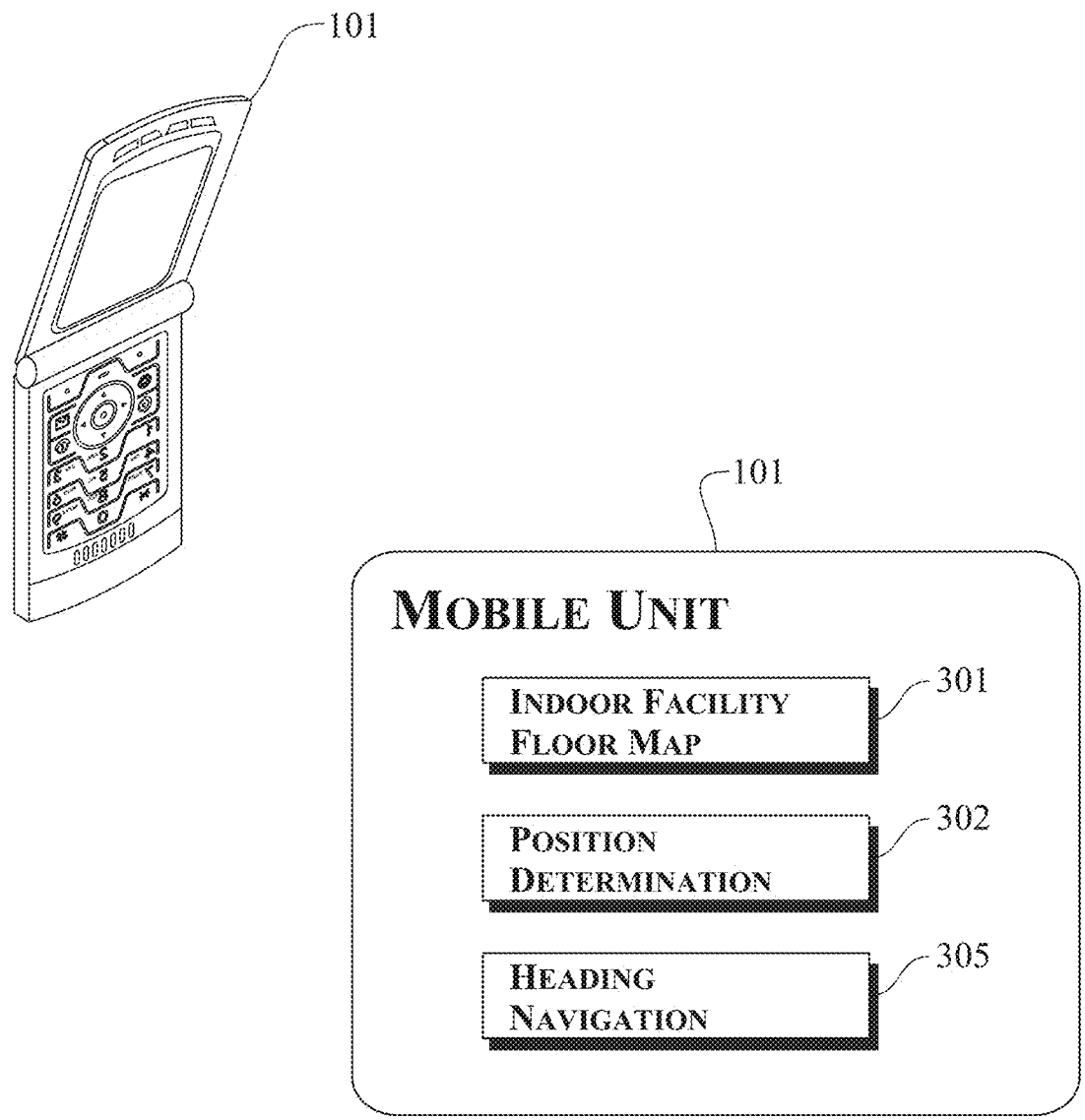
FIG. 3 is illustration of the mobile unit application system in accordance with the present invention.

Turning now to FIG. 3. This figure shows the cellular phone mobile unit 101, in operation as a Bluetooth application, the procedure is firs to load the facility floor map 301, which can be done remotely as a planning via Internet or web site before reaching the area to be navigate, or locally via Bluetooth connections at the facility, most likely at the entrance. After loading the floor map to be a background for the navigation a position determination 302, done by calculating the signal receiving directly from the sensor/tags and then provide the heading navigation 303, and the current user location on the floor map, 301.

Figure 4:
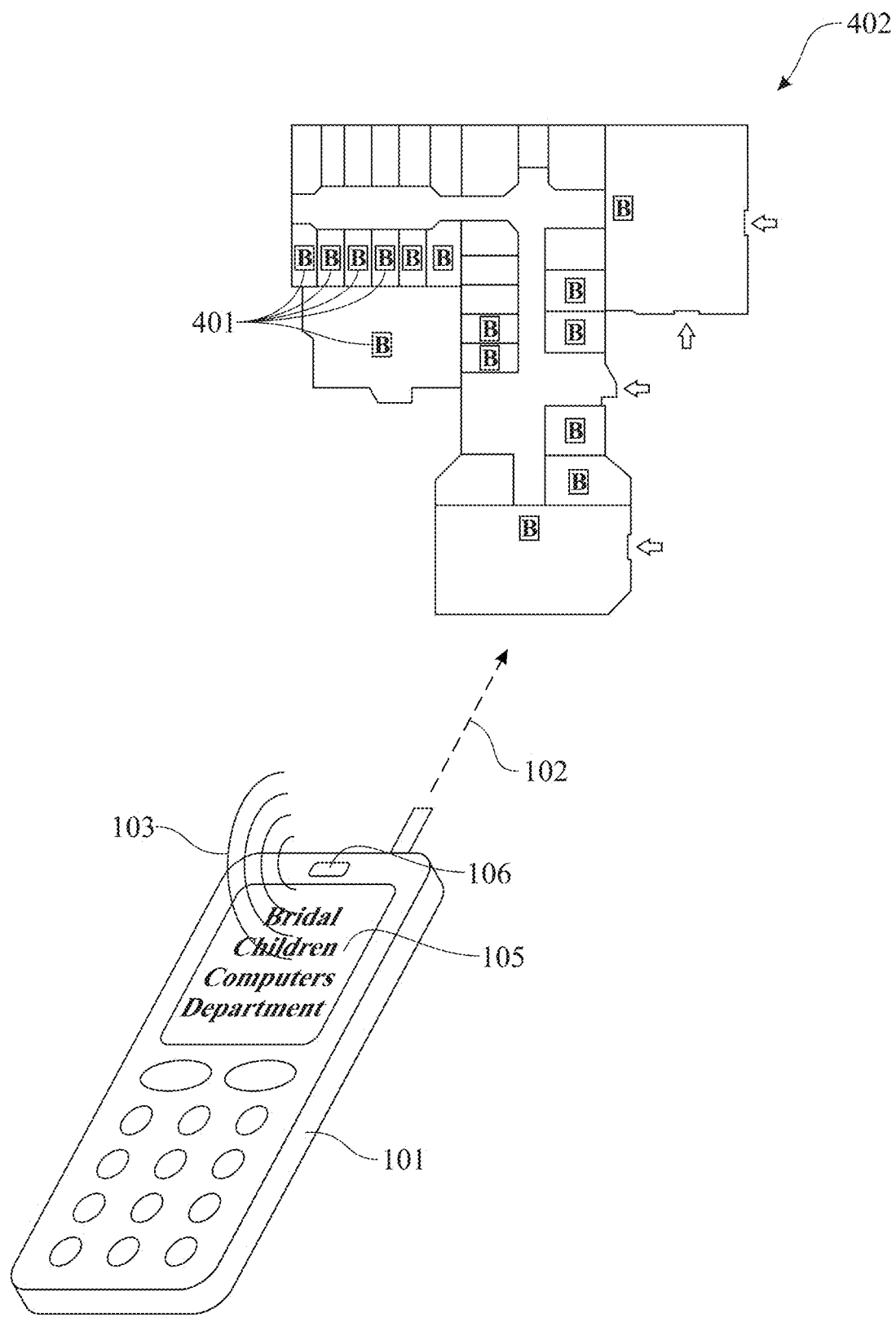
FIG. 4 is an illustration of the sensor tags in a network implement in a mall environment in accordance with the present invention.

Referring to FIG. 4. This figure shows an illustration of the mall 402, when each store represented by sensor/tag waypoint 401, in this illustration the mall's store can be view and be search by store type, store directory, or by alphabetical order, where each store/waypoint 401, will have a basic information-store information, like the store name, phone number, floor, address within the mall, and a small notes-small information representing the store. Again when the user approaches a sensor/tag/way point 401 he will be able to receive additional information regarding the store/product on his cellular phone/Bluetooth device e.g. special promotions, coupons, advertising or special sales to the phone as Bluetooth application.

The promotion can be also delivering via Bluetooth voice option utilize the Bluetooth options.

Figure 5:
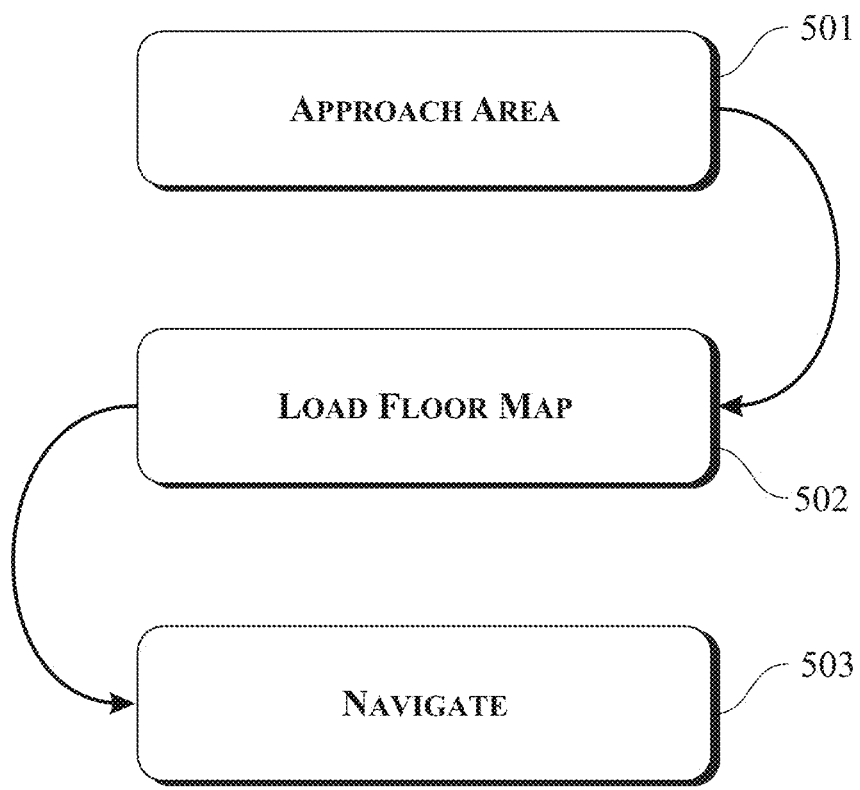
FIG. 5 is a flow diagram of the navigation system in accordance with the present invention.

Turning to FIG. 5. This figure shows the method of the disclosed system when the user reach the area 501, locally load the floor mapping 502, and navigate on the facility mapping 503.

Figure 6:
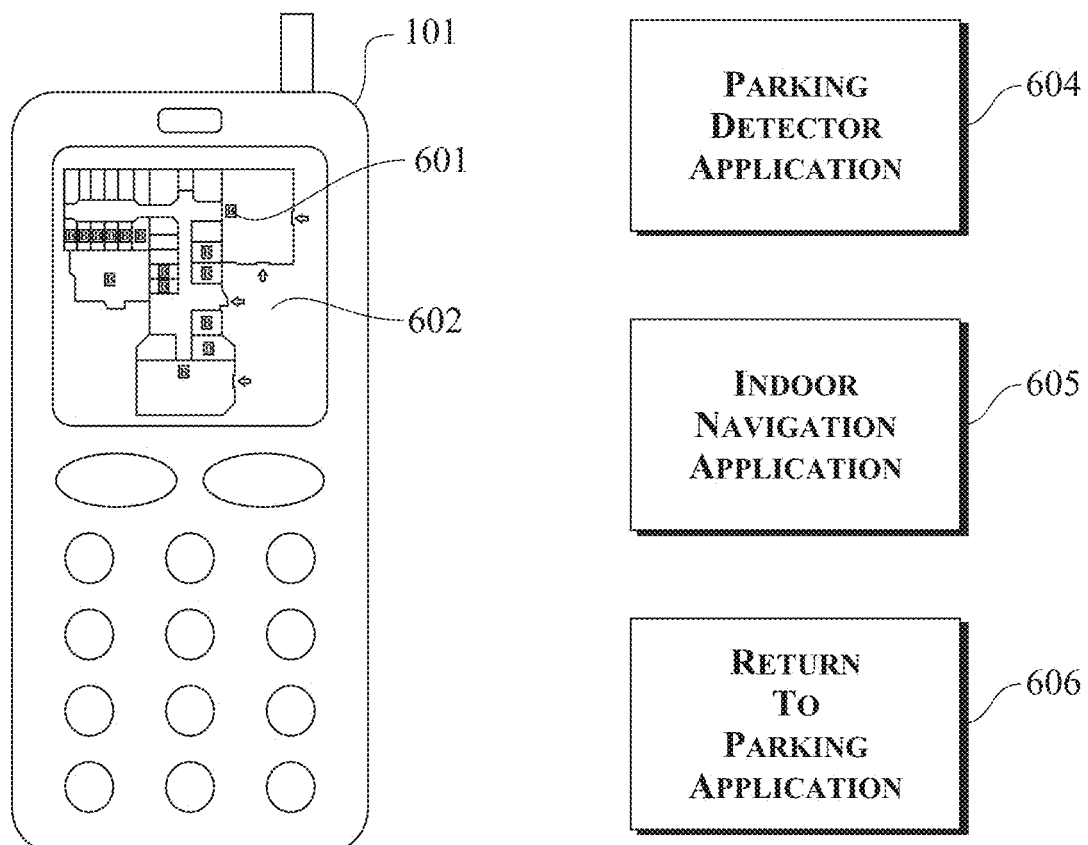
FIG. 6 is an illustration of the indoor navigation system in accordance with the present invention.
Figure 7:
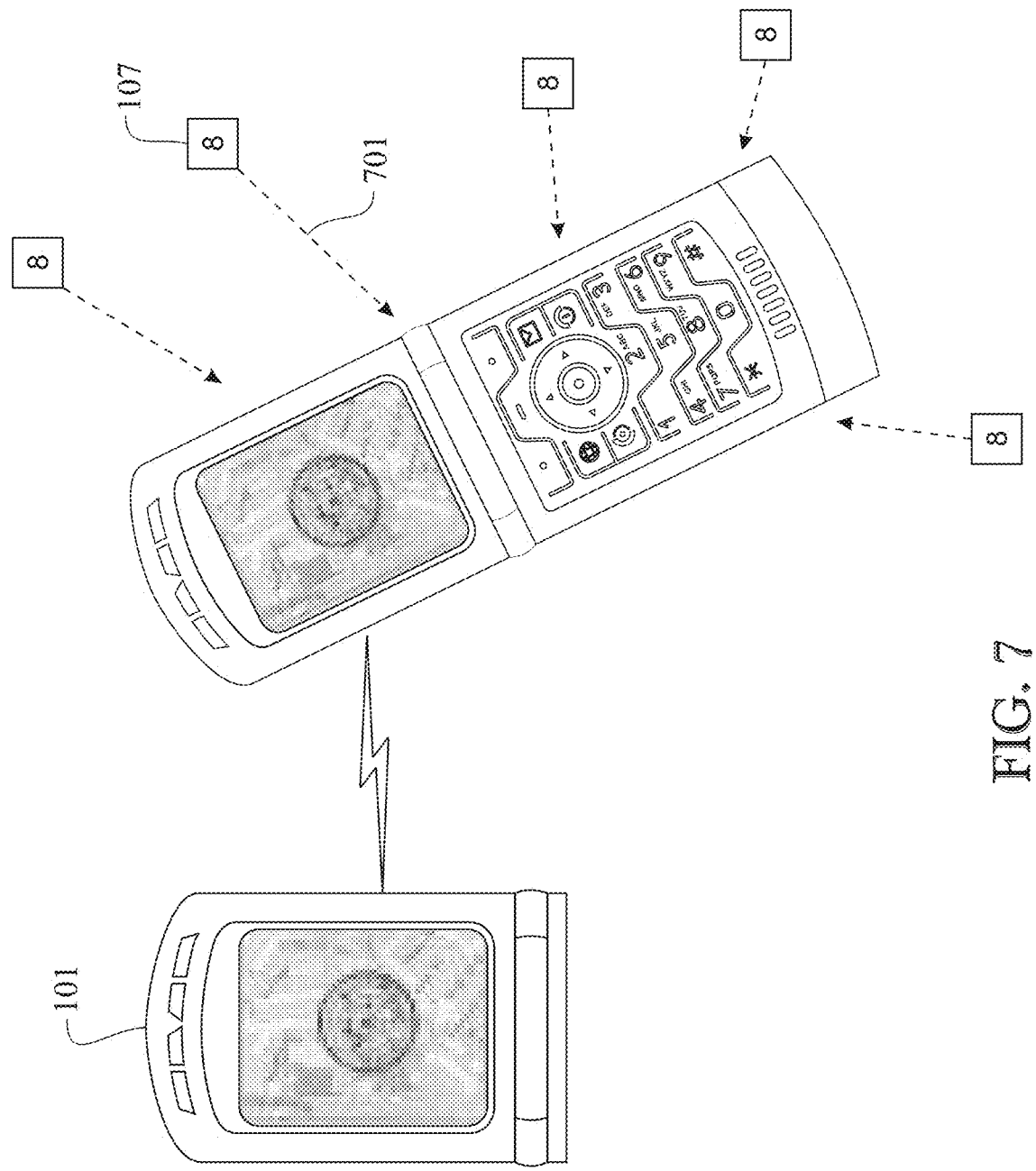
FIG. 7 is an illustration of the sensor tags in a network in accordance with the present invention.

Referring to FIG. 6. This figure shows an illustration of the disclosed navigation suite of application where the navigation is a cellular phone 101, as a Bluetooth device navigate on a background floor map of the facility 602, receiving a detect information and determination of the exact location of the user from a sensor base network implement in each known location like 601, store in a mall, the application in the disclosed suite of software to provide a navigation indoor or in a places where and when GPS signal is not available or not efficient to provide accurate to a waypoint/store, place:

Parking detector application 604, describe as a system and method to find an empty parking space from a sensor base network directly to the cellular phone utilize the cellular phone Bluetooth and no other communication needed.

Indoor navigation application 605, under Nav4 application that will describe in more details in FIG. 8A typical application is navigating a pedestrian in an environment like a mall, department store, specialty store, conference, trade show, amusement park, university, hospital, school, municipal building, museum, subway, train station, airport, down town center, any type of parking facility, or any place when and where GPS cannot be provided or is not accurate or precise enough. The system will be used for navigation by first responders to emergencies or disasters.

RTP 606—returns to parking—locates the place that you parked your car.

The disclosed system and associated method of use is part of the disclosed broad suite of applications that include a complete solution to the "user" from the time that he parks, or begins looking for a space to park his car, walking to the store/mall to when he wants to return to his parked car, looking for the place that he parked.

The suite includes:

Parking detector—and navigation to the empty available parking space.

Nav4 mall/store navigation solution inside mall store.

RTP—return to parking—locate the place that you parked your car.

For example, a typical application could be:

A pedestrian asks the way in a mall to a specific store.

A pedestrian asks the way inside the store, to a specific aisle or product. A shopper in a department store asks for a specific department.

A pedestrian asks the way to a point of interest. In an emergency, the first response team has to navigate inside a smoke filled building.

A system and method to provide user information that relates to the point of interest. The disclosed system provides detection and navigation reference, position determination and information related to the object—point of interest, directly and automatically to the user interface—cellular phone without any communication help of Internet/web or cellular needed Turning to FIG. 7. the sensor base network 107, is show and illustrate the direct broadcasting RF information 701, to the cellular phone as a Bluetooth device 101, again, there is no need for cellular communication or any Internet web communication or any central system nor any access to a database.

Figure 8:
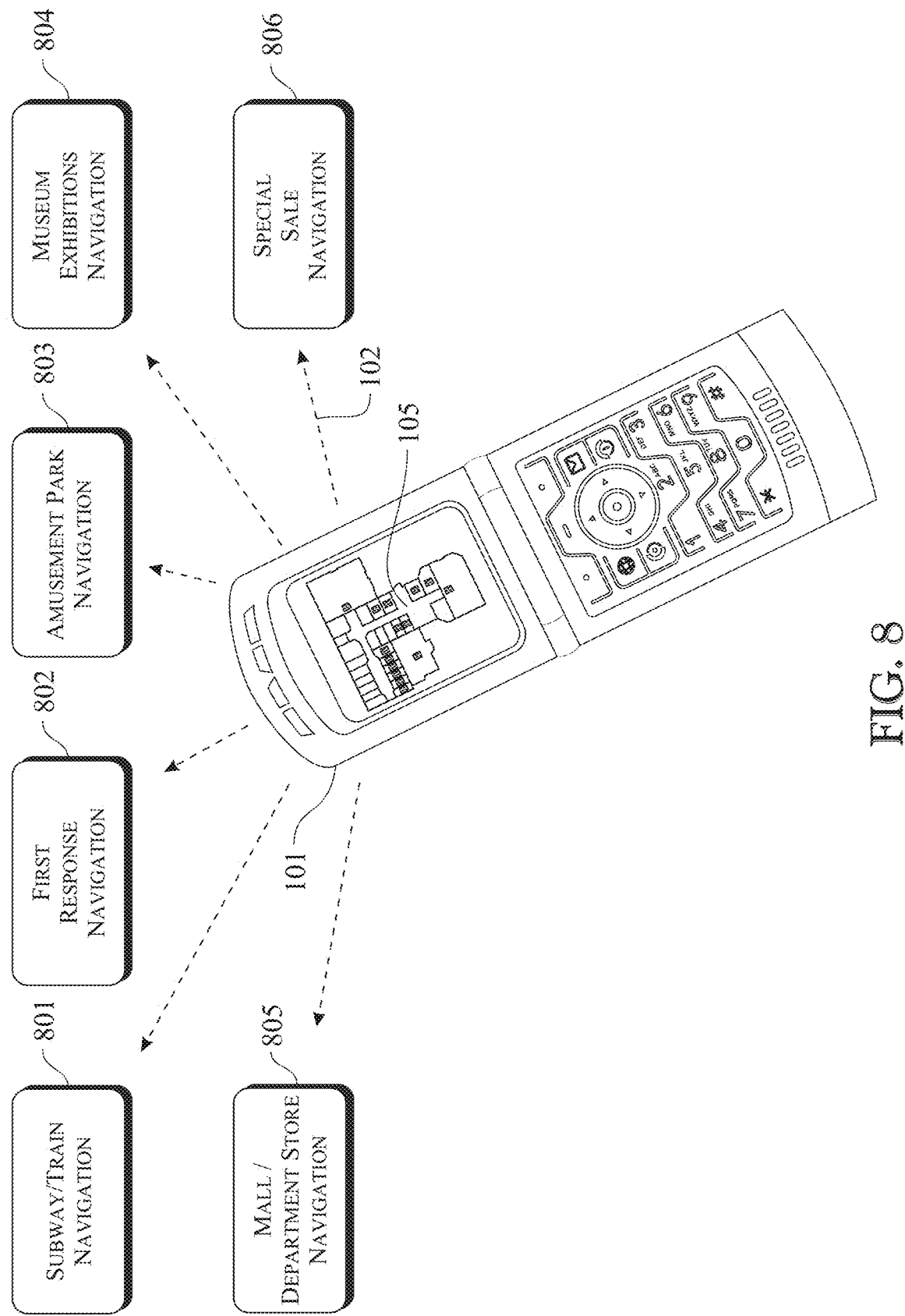
FIG. 8 is an illustration of the possibility application for the disclosed navigation system in accordance with the present invention.

Turning to FIG. 8, is an illustration of the possibility application for the disclosed navigation system The Nav4 indoor application: some of the possibilities of application are:

Special operation mode:—Shopping—NAV4SALE—806, provides navigation to the special sale item in a department store, coupons or other promotions and even audio or video via a Bluetooth interface as advertising directly push from the waypoint/store area to the user Bluetooth device/cellular phone.

Special operating mode:—Museums—NAV4Museums—804, provides navigation and interactive information from the museum's exhibition to the "user's" cellular phone device via Bluetooth interface, utilizing the Bluetooth the user can receive even audio and video information and there is no need to have a rental headset or additional information.

Special operating mode:—NAV4STORE—805, provides navigation inside a store/department store to a specific department/aisle or specific product, with option for advertising method and special promotion.

Special operating mode:—Amusement park—803, NAV4disney provides navigation and interactive information from amusements park exhibition to the "user's" cellular phone device via Bluetooth interface. Will provide navigation on the amusement map, the exhibition as a waypoint to provide information like schedule of show, availability (lines) time to the show, type of the waypoint like restrooms, food area etc. more over the disclosed navigating system method can provide also a user locating when and where there is need to locate the user/kid for example in the amusement park.

Special operating mode:—First response navigation, 802—More over the disclosed system can serve as a navigator for the emergency exit route when and where needed each user can load the emergency exit floor plan and escape with the knowledge of his exact location in that route.

Aspects of the scenarios to be included:

Identifies and tracks the user (a first response team member).

Provides the user with navigation information and directions for safely exiting of the building.

Provides location information of all team members, via an ad hoc network of radio terminals that combine RF/Bluetooth readings and radio communication.

Special operating mode:—NAV4Train—801, provides The user with ability to know his exact location in the train, subway station on a route directly to his phone as a Bluetooth device, more over the train/subway/underground map will be the basic for the background navigation and will show the user his location in the train/subway route, no more walking to the mapping inside the station or try to figure out your location in the map inside the subway train, each station will have a tag/sensor all the route to provide the user accurate locating and additional information that he may need like schedule, restroom, food, emergency etc.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of providing a user a point of interest (POI) waypoints information and navigation to a display device indoor and outdoor wherein the display device is selected from a group consisting of a portable display device, a mobile phone, a hand held navigation system, a car navigation system, a navigation and mapping system and Bluetooth enable devices, the method comprising steps of:

a. determining a current position of the display device, wherein the current position of the display device is determined based upon information received from at least one short range Radio Frequency (RF) transceiving device located in a proximity of the display device;

b. displaying a position marking representative of the current position of the display device on the display device, wherein the current position is shown on one of a overlay local map or a facility area map;

c. displaying waypoint information containing local based services associated within a determined location, wherein local based services contents includes: a display that identifies each type of waypoint within at least one of a local area proximate the display device and a facility proximate the display device;

d. displaying additional local base services related to the waypoints in at least one of a local area proximate the display device and a facility proximate the display device, including at least one of: a store name, a telephone number, a floor, an address, a time of an event related to the waypoint, and notes representing a business/store; and e. offering to provide additional information regarding businesses located proximate to the display device, the additional information include at least one of: a special promotion, a coupon, advertising, and special sales.

2. The method as recited in claim 1, wherein the display utilizes color coding to identify each type of waypoint within the at least one of the local area proximate the display device and the facility proximate the display device.

3. The method as recited in claim 2, further comprising a step of using the color coding to access information pertaining to the respective type of waypoint.

4. The method as recited in claim 1, the display device travels indoors and outdoors, wherein the current position of the display device is determined by using a Global Positioning System (GPS) in a condition where the display device is in an outdoor environment and utilizing the at least one short range Radio Frequency (RF) device, wherein the at least one short range Radio Frequency (RF) device resides in known locations in an indoor environment and programmed to identify one or more of the at least one short range Radio Frequency (RF) transceiving device, wherein the at least one short range Radio Frequency (RF) transceiving device broadcasts at least one of a Wi-Fi signal, a Bluetooth signal, or a Radio Frequency ID (RFID) signal.

5. The method as recited in claim 4, wherein when the display device is located within an indoor environment, the current position of display device is determined by at least one of: proximity detection (PD), receiving signal strength (RSSI), time of arrival (TOA), angle of arrival (AOA), and triangulation.

6. The method as recited in claim 1, wherein each waypoint is associated with a fixed location having a known address location including longitude and latitude coordinates, and in a multi-floor structure, a floor number,
wherein the disclosed mapping and navigation system includes an ability to store a database of waypoints for the local based services.

7. The method as recited in claim 1, further comprising steps of making available and making use of an indoor local base services application on the display device, the indoor local based services application comprises at least one of:
a) map and indoor guide and navigation-obtaining a local area map and application;
b) directory-obtaining at least one of a store/mall directory, a local area directory, a store type, and store information as part of—the local mapping information to the display device;
c) search and find-searching and locating at least one of a store, a place, an item, and a product, wherein the at least one of the store, the place, the item, and the product is associated with the at least one of the store/mall directory, the local area directory, the store type, and the store information;
d) sales/specials-obtaining at least one of a discount, a sale, and a coupon, presenting the at least one of the discount, the sale, and the coupon and providing store aisle navigation upon the display device, wherein the store aisle navigation directs the user to a store aisle containing an items associated with the at least one of the discount, the sale, and the coupon;
e) parking—determining available parking spaces in a vicinity of the display device and providing navigation to the user by displaying available parking spaces on the display device, wherein the parking spaces are associated with the location of the short range Radio Frequency (RF) transceiving device;
f) return to parking-identifying a location of a parked car associated with the display device and providing navigation to return the user to the location of the parked car through a display on the display device, wherein a parking space containing the parked car is associated with the location of the short range Radio Frequency (RF) transceiving device;
g) info-provide information about events, restrooms, ATM location, seating area, Kids playground, fountain, public phones;
h) emergency-obtaining emergency information and emergency navigation associated with the facility area, and displaying the emergency information and emergency navigation associated with the facility area on the display device, wherein the emergency navigation is based upon at least one of the location of the display device and the location of the short range Radio Frequency (RF) transceiving device; and
i) panic-emitting a panic alert, wherein the panic alert requests.

8. The method as recited in claim 1, further comprising a step of displaying additional information associated with at least one waypoint, wherein the additional information includes at least one of a store, a department, a special sale, an event, and a coupon,
wherein the additional information is updated in real time.

9. The method as recited in claim 1, further comprising a step of navigating between waypoints illustrated on the local floor plan of the facility indoor mapping using the application displaying the known waypoints, wherein at least one of the facility indoor mapping and the waypoints associated with short range Radio Frequency (RF) transceiving device that are in a proximity of the display device at the facility.

10. The method as recited in claim 1, further comprising a step of providing navigation to a pedestrian within an environment within a facility selected from a facility group consisting of: a mall, a department store, a specialty store, a conference, a trade show, an amusement park, a stadium, an arena, a sporting event, a university, a hospital, a school, a municipal building, a museum, a subway, a train station, an airport, a down town center, a cruise ship, a financial banking location, a parking facility and a covered structure.

11. The method as recited in claim 1, further comprising a step of providing an indoor guide and navigation within one of: a museum, within a show, a conference, and an exhibition,
wherein the guide and navigation is provided to the user by at least one of audio, video, and content information using the display device.

12. The method as recited in claim 1, further comprising a step of providing a local guide and navigation specifically associated with real estate, identifying local property that is available for at least one of sale, lease, and rent.

13. The method as recited in claim 1, further comprising steps of providing guidance and navigation associated with an amusement park having waypoints identifying specific points of interest within the amusement park, and
displaying information associated with the amusement park including at least one of a schedule of show, wait times for a show, time to the show, a restroom location, a food service area and a process for reducing a wait time for access to a show or attraction.

14. The method as recited in claim 1, further comprising a step of providing navigation for an emergency exit route utilizing a location of at least one of the display device and the location of the proximate RF device within the facility area to determine the emergency exit route and providing updated guidance for directing a user to safely exit the facility area.

15. The method at recited in claim 14, further comprising a step of:
providing a local business with information about behavior habit of a customer without compromising at least one of an identity of the customer and privacy of the customer.

16. The method as recited in claim 1, further comprising steps of:
providing a display device with a current location of at least one of: a train, a bus, and a subway train on a route directly to the display device, wherein the current location of at least one of the train, the bus, and the subway train is displayed upon a train/subway/underground map,
presenting the display device location in the route, and
presenting additional information including at least one of a schedule, a restroom location, a food serving location, and an emergency route, wherein the additional information is determined by the short range RF transceiving device identifier of the short range Radio Frequency (RF) transceiving device located proximate to the display device, wherein the short range RF transceiving device identifier is an electronic identifier associated with the respective short range RF transceiving device, the short range RF transceiving device identifier being encoded within the signal transmitted from the short range RF transceiving device.

17. The method at recited in claim 1, further comprising steps of:
providing a location based service (LBS) application and information content based on at least one of a location of a user as determined by at least one of the position of the display device and the location associated with a short range RF transceiving device identifier, wherein the short range RF transceiving device identifier is an electronic identifier associated with the respective short range RF transceiving device, the short range RF transceiving device identifier being encoded within the signal transmitted from the short range RF transceiving device, a behavior habit obtained from the display device, and a profile provided by data obtained from the display device, wherein the LBS and information content comprises at least one of: a special, a sale, and a promotion events coupon; and
designating a business as a waypoint and presenting advertisements associated with the business on the display device.

18. The method at recited in claim 1, further comprising a step of providing navigation to the user through the user's mobile device, wherein the navigation includes information associated with a hospitality industry, wherein the hospitality industry information includes at least one of:
waypoints associated with resorts,
waypoints associated with hotels,
waypoints associated with cruise ships,
waypoints associated with real estate sales listings, and
waypoints associated with real estate rental listings.

19. The method at recited in claim 1, wherein the facility area is associated with a hospitality environment, wherein the hospitality environment is at least one of a cruise ship, a resort area, and a resort hotel, the method further comprising a employing hospitality environment infrastructure, wherein the infrastructure includes the plurality of short range Radio Frequency (RF) transceiving devices reside at known locations about the hospitality environment; and
at least one of:
a step of providing navigation about the hospitality environment,
a step of providing navigation to at least one of: a merchant location, an event location, a restroom location and a food service provider location within the hospitality environment, and
a step of providing navigation to the user directing the user from the location of the mobile device, along an emergency exit route with the hospitality environment, and to a safe location associated with the hospitality environment.

20. The method as recited in claim 1, further comprising a step of providing guide and navigation for a hospitality facility for at least one of indoor guidance and navigation, a schedules of events, a floor level, a time of an event associated with the hospitality facility, transportation, food area, restaurant, emergency and evacuation guidance on a map of the hospitality facility, and delivery of additional content associated with the hospitality facility to the display device.

21. The method as recited in claim 1, further comprising a step of providing a guide and navigation for a cruise ship for at least one of: indoor navigation, a schedule of shows, events, a food area, restaurants, emergency and evacuation guidance on a map of the cruise ship, and delivery of additional content associated with the cruise ship to the display device.

22. The method as recited in claim 1, further comprising a step of providing a guide and navigation for an airport for at least one of: indoor navigation, a schedule, a floor level, a time of an event associated with the airport, transportation, a food area, restaurants, emergency and evacuation guidance on a map of the airport, and delivery of additional content associated with the airport to the display device.

23. The method as recited in claim 1, further comprising a step of providing a guide and navigation for a hospital for at least one of: indoor navigation, a schedule, a floor level, a time of an event associated with the hospital, transportation, a food area, restaurants, emergency and evacuation guidance on a map of the hospital, and delivery of additional content associated with the hospital to the display device.

24. The method as recited in claim 1, further comprising a step of providing a guide and navigation for a building for at least one of: indoor navigation, a schedule, a floor level, a time a time of an event associated with the building, transportation, a food area, restaurants, emergency and evacuation guidance on a map of the building, and delivery of additional content associated with the building to the display device.

25. The method as recited in claim 24, wherein the building is one of an apartment, a school, or a university.

26. The method as recited in claim 1, further comprising a step of displaying a position marking identifying a location of the display device onto the one of the overlay local map or the facility area map presented on a display of the display device.

27. The method as recited in claim 1, wherein the step of determining the location of the display device based upon information received from at least one short range Radio Frequency (RF) transceiving device located in a proximity of the display device determines a precise location of the display device.

28. A method of providing emergency information to assist in an emergency (911) situation by interacting with a display device in an indoor environment and an outdoor environment, wherein the display device is selected from a group consisting of a portable display device, a mobile phone, a hand held navigation system, a car navigation system, a navigation and mapping system and Bluetooth enable devices, the method comprising:
a step of identifying a location of the display device is determined using signals received from at least one short range Radio Frequency (RF) transceiving device located within a proximity of the display device,
the method further comprising at least one of the following functions:
a. identifying and tracking the user location by using a changing location of the display device over time;

b. informing emergency personnel of a location of a user, wherein the location of the user is based upon the location of the display device;
c. enabling storage of critical information on the display device; and
d. providing at least one of a floor map and an emergency plan to guide and navigate the user in an emergency situation, wherein the floor map and emergency plan are based upon the determined location of the display device.

29. The method as recited in claim 28, wherein the current position of the display device is determined by using a Global Positioning System (GPS) when the display device is in an outdoor environment and utilizing existing broadcasting short range Radio Frequency (RF) transceiving devices, wherein the short range RF transceiving devices reside in known locations in an indoor environment and programmed to identify each short range RF transceiving device, wherein the short range RF transceiving devices broadcast at least one of a Wi-Fi signal, a Bluetooth signal, or a Radiofrequency (RFID) signal.

30. The method as recited in claim 29, wherein when the display device is located within an indoor environment, the current position of display device is determined by at least one of: proximity detection (PD), receiving signal strength (RSSI), time of arrival (TOA), angle of arrival (AOA), and triangulation.

31. The method as recited in claim 28, wherein one or more of the at least one short range Radio Frequency (RF) transceiving device identifies a waypoint in a proximity of the respective at least one short range Radio Frequency (RF) transceiving device with a known address location including longitude and latitude coordinates, and in a multi-floor structure, a floor number,
    wherein the disclosed emergency system is capable of storing a database of the short range RF transceiving devices for use in an emergency location using local based services.

32. The method as recited in claim 28, further comprising a step of displaying a position marking identifying a location of the display device onto one of a local map, a floor map, or a facility area map presented on a display of the display device.

33. The method as recited in claim 28, further comprising a step of the display device obtains information identifying a waypoint within the at least one of:
    (a) the local area proximate the display device and
    (b) the facility proximate the display device.

34. The method as recited in claim 33, wherein the display utilizes color coding to identify each type of waypoint within the at least one of the local area proximate the display device and the facility proximate the display device.

35. The method as recited in claim 34, further comprising a step of using the color coding to access information pertaining to the respective type of waypoint.

36. The method as recited in claim 28, wherein the step of determining the location of the display device based upon information received from at least one short range Radio Frequency (RF) transceiving device located in a proximity of the display device determines a precise location of the display device.

37. A method for determining a current position of a display device and providing location based service (LBS) application and information content to the display device, the method comprising steps of:
    determining the current position of the display device when located within a facility area by utilizing a proximity of the display device respective to a plurality of short range Radio Frequency (RF) transceiving devices reside in known positions within the facility area and at least one signal received from the plurality of short range Radio Frequency (RF) transceiving devices, wherein the step of determining the current position is accomplished by at least one of:
    a) utilizing a location reference of one or more of the plurality of short range RF transceiving devices when the display device receives a signal from one short range RF transceiving device of the plurality of short range single RF transceiving devices,
    b) utilizing signal strengths of the RF transceiving devices when the display device receives signals from multiple tags, and
    c) utilizing a triangulation calculation when the display device receives signals from multiple tags;
    providing a local business with information about customer behavior habit without compromising user ID or privacy;
    providing the location based service (LBS) application and information content based on at least one of a location of a user as determined by at least one of the position of the display device and the location associated with a short range RF transceiving device identifier, the short range RF transceiving device identifier being an electronic identifier associated with the respective short range RF transceiving device encoded within the signal transmitted from the short range RF transceiving device, a behavior habit obtained from the display device, and a profile provided by data obtained from the display device, wherein the LBS and information content comprises at least one of: a special, a sale, and a promotion events coupon; and
    designating a business as a waypoint and presenting advertisements associated with the business on the display device.

* * * * *